United States Patent
Button et al.

(10) Patent No.: US 9,430,570 B2
(45) Date of Patent: Aug. 30, 2016

(54) SYSTEMS AND METHODS FOR DETERMINING INFORMATION AND KNOWLEDGE RELEVANCY, RELEVANT KNOWLEDGE DISCOVERY AND INTERACTIONS, AND KNOWLEDGE CREATION

(75) Inventors: Simon James Button, Bridgeman Downs (AU); Matthew Jeremy Kapp, Potts Point (AU)

(73) Assignee: Matthew Jeremy Kapp, Double Bay (AU)

( * ) Notice: Subject to any disclaimer, the term of this patent is extended or adjusted under 35 U.S.C. 154(b) by 318 days.

(21) Appl. No.: 13/379,280

(22) PCT Filed: Jun. 30, 2010

(86) PCT No.: PCT/AU2010/000836
§ 371 (c)(1),
(2), (4) Date: Dec. 19, 2011

(87) PCT Pub. No.: WO2011/000046
PCT Pub. Date: Jan. 6, 2011

(65) Prior Publication Data
US 2012/0102050 A1    Apr. 26, 2012

Related U.S. Application Data

(60) Provisional application No. 61/222,118, filed on Jul. 1, 2009.

(51) Int. Cl.
*G06F 17/30* (2006.01)
*G06N 5/04* (2006.01)

(52) U.S. Cl.
CPC ......... *G06F 17/30867* (2013.01); *G06N 5/043* (2013.01)

(58) Field of Classification Search
CPC ................... G06F 17/30648; G06F 17/30867
USPC ........................................................ 707/749
See application file for complete search history.

(56) References Cited

U.S. PATENT DOCUMENTS

| | | | |
|---|---|---|---|
| 8,412,698 B1* | 4/2013 | Sarukkai | G06F 17/30637 707/706 |
| 8,522,310 B1* | 8/2013 | Buckwalter | G06F 21/31 726/2 |
| 8,949,232 B2* | 2/2015 | Harrington | G06F 17/30864 707/732 |
| 9,141,656 B1* | 9/2015 | Lopyrev | G06F 17/30321 |
| 2007/0143427 A1 | 6/2007 | Tischer | |
| 2007/0156677 A1 | 7/2007 | Szabo | |
| 2008/0091633 A1 | 4/2008 | Rappaport et al. | |
| 2009/0100047 A1* | 4/2009 | Jones | G06F 17/30648 |
| 2010/0131489 A1* | 5/2010 | Goldman-Shenhar | G06F 17/30867 707/710 |
| 2010/0312797 A1* | 12/2010 | Peng | G06F 17/30011 707/776 |

FOREIGN PATENT DOCUMENTS

EP    1843256    10/2007
WO    WO2008/153625    12/2008

OTHER PUBLICATIONS

International Search Report dated Sep. 20, 2010 for PCT/AU2010/000836.

* cited by examiner

*Primary Examiner* — Noosha Arjomandi
(74) *Attorney, Agent, or Firm* — Brummett TechLaw PLLC

(57) ABSTRACT

Systems and methods for determining user specific information and knowledge relevancy, relevant knowledge and information discovery, user intent and relevant interactions via intelligent messaging, collaboration, sharing and information categorization, further delivering created knowledge accessible through a personalized user experience.

25 Claims, 20 Drawing Sheets

FIG. 12

```
<Feature rdf:about="http://sws.geonames.org/3020251/">
    <name xml:lang="fr">Embrun</name>
        <alternateName xml:lang="fr">Embrun, Hautes-Alpes</alternateName>
    <featureClass rdf:resource="http://www.geonames.org/ontology#P"/>
    <featureCode rdf:resource="http://www.geonames.org/ontology#P.PPL"/>
        <inCountry rdf:resource="http://www.geonames.org/countries/#FR"/>
        <population>7069</population>
        <postalCode>05200</postalCode>
        <wgs84_pos:alt>900</wgs84_pos:alt>
        <wgs84_pos:lat>44.5667</wgs84_pos:lat>
        <wgs84_pos:long>6.5000</wgs84_pos:long>
        <parentFeature rdf:resource="http://sws.geonames.org/3013738/"/>
        <nearbyFeatures rdf:resource="http://sws.geonames.org/3020251/nearby.rdf"/>
        <locationMap>http://www.geonames.org/3020251/embrun.html</locationMap>
        <wikipediaArticle rdf:resource="http://fr.wikipedia.org/wiki/Embrun_%28Hautes-Alpes%29"/>
        <wikipediaArticle rdf:resource="http://pl.wikipedia.org/wiki/Embrun"/>
        <wikipediaArticle rdf:resource="http://de.wikipedia.org/wiki/Embrun"/>
        <wikipediaArticle rdf:resource="http://en.wikipedia.org/wiki/Embrun%2C_Hautes-Alpes"/>
        <wikipediaArticle rdf:resource="http://it.wikipedia.org/wiki/Embrun"/>
        <wikipediaArticle rdf:resource="http://nl.wikipedia.org/wiki/Embrun"/>
        <owl:sameAs rdf:resource="http://rdf.insee.fr/geo/COM_05046"/>
</Feature>
```

FIG. 13

```
<sioc:Post rdf:about="http://johnbreslin.com/blog/2006/09/07/creating-connections-between-
discussion-clouds-with-sioc/">
    <dc:title>Creating connections between discussion clouds with SIOC</dc:title>
    <dcterms:created>2006-09-07T09:33:30Z</dcterms:created>
    <sioc:has_container
rdf:resource="http://johnbreslin.com/blog/index.php?sioc_type=site#weblog"/>
    <sioc:has_creator>
        <sioc:User rdf:about="http://johnbreslin.com/blog/author/cloud/" rdfs:label="Cloud">
            <rdfs:seeAlso
rdf:resource="http://johnbreslin.com/blog/index.php?sioc_type=user&sioc_id=1"/>
        </sioc:User>
    </sioc:has_creator>
    <foaf:maker rdf:resource="http://johnbreslin.com/blog/author/cloud/#foaf"/>
    <sioc:content>SIOC provides a unified vocabulary for content and interaction description:
a semantic layer that can co-exist with existing discussion platforms.
    </sioc:content>
    <sioc:topic rdfs:label="Semantic Web"
rdf:resource="http://johnbreslin.com/blog/category/semantic-web/"/>
    <sioc:topic rdfs:label="Blogs"
rdf:resource="http://johnbreslin.com/blog/category/blogs/"/>
    <sioc:has_reply>
        <sioc:Post rdf:about="http://johnbreslin.com/blog/2006/09/07/creating-connections-
between-discussion-clouds-with-sioc/#comment-123928">
            <rdfs:seeAlso
rdf:resource="http://johnbreslin.com/blog/index.php?sioc_type=comment&sioc_id=123928"/>
        </sioc:Post>
    </sioc:has_reply>
</sioc:Post>
```

FIG. 14

```xml
<?xml version="1.0"?>
<APML xmlns="http://www.apml.org/apml-0.6" version="0.6" >
  <Head>
    <Title>Example APML file for apml.org</Title>
    <Generator>Written by Hand</Generator>
    <UserEmail>sample@apml.org</UserEmail>
    <DateCreated>2007-03-11T01:55:00Z</DateCreated>
  </Head>
  <Body defaultprofile="Work">
    <Profile name="Home">
      <ImplicitData>
        <Concepts>
        <Concept key="attention" value="0.99" from="GatheringTool.com" updated="2007-03-11T01:55:00Z" />
        <Concept key="content distribution" value="0.97" from="GatheringTool.com" updated="2007-03-11T01:55:00Z" />
          <Concept key="information" value="0.95" from="GatheringTool.com" updated="2007-03-11T01:55:00Z" />
          <Concept key="business" value="0.93" from="GatheringTool.com" updated="2007-03-11T01:55:00Z" />
          <Concept key="alerting" value="0.91" from="GatheringTool.com" updated="2007-03-11T01:55:00Z" />
          <Concept key="intelligent agents" value="0.89" from="GatheringTool.com" updated="2007-03-11T01:55:00Z" />
          <Concept key="development" value="0.87" from="GatheringTool.com" updated="2007-03-11T01:55:00Z" />
          <Concept key="service" value="0.85" from="GatheringTool.com" updated="2007-03-11T01:55:00Z" />
          <Concept key="user interface" value="0.83" from="GatheringTool.com" updated="2007-03-11T01:55:00Z" />
          <Concept key="experience design" value="0.81" from="GatheringTool.com" updated="2007-03-11T01:55:00Z" />
          <Concept key="site design" value="0.79" from="GatheringTool.com" updated="2007-03-11T01:55:00Z" />
          <Concept key="television" value="0.77" from="GatheringTool.com" updated="2007-03-11T01:55:00Z" />
          <Concept key="management" value="0.75" from="GatheringTool.com" updated="2007-03-11T01:55:00Z" />
          <Concept key="media" value="0.73" from="GatheringTool.com" updated="2007-03-11T01:55:00Z" />
        </Concepts>
        <Sources>
          <Source key="http://feeds.feedburner.com/apmlspec" name="APML.org" value="1.00" type="application/rss+xml" from="GatheringTool.com" updated="2007-03-11T01:55:00Z">
            <Author key="Sample" value="0.5" from="GatheringTool.com" updated="2007-03-11T01:55:00Z" />
          </Source>
        </Sources>
      </ImplicitData>
      <ExplicitData>
        <Concepts>
          <Concept key="direct attention" value="0.99" />
        </Concepts>
        <Sources>
          <Source key="http://feeds.feedburner.com/TechCrunch" name="Techcrunch" type="application/rss+xml" value="0.4">
            <Author key="ExplicitSample" value="0.5" />
          </Source>
        </Sources>
      </ExplicitData>
    </Profile>
    <Profile name="Work">
      <ImplicitData />
      <ExplicitData>
        <Concepts>
          <Concept key="Golf" value="0.2" />
        </Concepts>
        <Sources>
          <Source key="http://feeds.feedburner.com/TechCrunch" name="Techcrunch" type="application/atom+xml" value="0.4">
            <Author key="ProfessionalBlogger" value="0.5" />
          </Source>
        </Sources>
      </ExplicitData>
    </Profile>
    <Applications>
      <Application name="sample.com">
        <SampleAppEl />
      </Application>
    </Applications>
  </Body>
</APML>
```

SYSTEMS AND METHODS FOR DETERMINING INFORMATION AND KNOWLEDGE RELEVANCY, RELEVANT KNOWLEDGE DISCOVERY AND INTERACTIONS, AND KNOWLEDGE CREATION

CROSS REFERENCE

This application is the National Phase application of International Application No. PCT/AU2010/000836, filed Jun. 30, 2010, which designates the United States and was published in English, which claims priority to U.S. Provisional Application No. 61/222,118, filed Jul. 1, 2009. These applications, in their entirety, are incorporated herein by reference.

TECHNICAL FIELD

The present disclosure concerns the field of information and knowledge management, and more particularly systems and methods for enhancing a user's ability to search, discover, browse, share and collaborate with information and knowledge through a personalised relevancy interface used to facilitate such actions.

BACKGROUND

The explosion of available information on the web coupled with the ever increasing mechanisms to interact is driving the need for a more effective, efficient, relevant and natural interface to support access to information, applications and people as well as facilitate people-to-people and people-to-information interactions. Users of the web today are suffering from constant partial attention where their attentiveness is constantly divided amongst an overabundance of information sources. The net result of this information overload is loss of opportunity, loss of focus and a poverty of attention in general.

With the explosion of new knowledge and information on the web, the half life of these entities decreases. This presents challenges in how to deliver online services and value propositions to the end user at an ever increasing quality, speed and relevance. The ability to smartly focus a user's attention, conversation, interaction and collaboration habits ultimately work towards securing a better "return on attention" for the user.

Today's systems lack an ability to condition and rank immense corpuses of online information based on a relevancy weighting that is unique to each individual user and therefore a user typically enjoys a lower personalised return on attention impacting on a user's efficiency and effectiveness in completing any online tasks.

Furthermore, with the explosion of new knowledge and information on the web, in the cloud, within corporate environments and accessible to the user from within their own computing devices, there is an increased opportunity for intelligent systems to create new knowledge.

Conventional mechanisms for focusing a user's attention, providing relevance and supporting intelligent collaboration, interaction and knowledge discovery/search are suffering from a variety of deficiencies.

SUMMARY

Certain embodiments of the present disclosure overcome such deficiencies and provide systems, methods, mechanisms and/or techniques that apply semantic technology, artificial intelligence, social network, cloud computing, mobile computing, enterprise solutions or combinations thereof to rank the relevancy of information and/or knowledge (whereby knowledge is defined as the concise and appropriate collection of one or a plurality of information combined in a way that makes it useful under certain context) available to a user, according to user-specific and context-specific relevancy factors. A personalised relevancy interface may be established to graphically represent and order such information and/or knowledge based on relevancy rank. Actions and/or interactions associated with such information and/or knowledge may be presented, thereby allowing the user to perform such functions to information and/or knowledge including but not limited to discover, search, share, collaborate with, rate, modify, create new, or combinations thereof.

Certain embodiments may include the definition and/or utilisation of contextual states that can be either predefined or user defined. Such states represent a state within the system that may be determined from a user's interaction with the environment, the system, or combinations thereof, whereby the system becomes contextually aware. A user can associate particular user specific aspects, including but not limited to, one or more particular devices, one or more communication channels (e.g. a particular email address), one or more information sources, one or more social networks, one or more enterprise repositories, or combinations thereof to a contextual state. Additionally, the system and/or the user can further associate user location, user activity, user interaction, time, social context, presence, or combinations thereof to a contextual state. Such user-defined and system associations can be used by the system to determine the user's context based on interactions by, with or within such association(s). Therefore, the system can determine the context of the user based on the environment of the user and/or the user's actions within the system. Furthermore, the system can map relevant objects (e.g. an email from a particular email address) relating to such associations to a particular user's contextual state.

Certain embodiments may include how a user's priorities, interests, preferences, social context, or combinations thereof are determined and subsequently utilised by the system to develop a user's personalised attention profile (PAP). User priorities, interests, preferences, social context, or combinations thereof can be determined through various techniques including, but not limited to, behavioural modelling of interactions, analysis of information consumed, social context analysis, or combinations thereof. Given a user's priorities, interests, priorities, preferences, social context, or combinations thereof continually, or substantially continually change with changes of context, a user exhibits a PAP for each contextual state within the system. Additionally, a user's priorities, interests, preferences, social context, or combinations thereof, periodically change within the same context resulting in a user's PAP changing within the same contextual state within the system. A user's PAP for a particular contextual state and its semantic metadata representation can be shared through a system API.

Certain embodiments may include how user psychometric data is utilised within the system. The system can obtain a user's psychometric variables, and subsequently develop a user's personalised psychometric profile (PPP). PPP may have several components related to personal knowledge, personal cognitive abilities, personal attitudes, personal personality or combinations thereof. Use of other components is contemplated, for example personal behaviour, personal culture, social capabilities or combinations thereof. PPP can be used to enable information and/or abilities transactions within the system such that knowledge, know-how, experience, expertise, affinities or combinations thereof are transacted between users and/or agents. A user's PPP and its semantic metadata representation can be shared through a system API. Furthermore, the user's access device may interact with the user's PPP such that the device may control interactions between the device and other users, agents, information, knowledge or combinations thereof without the direct involvement of the user of the device.

In a further aspect, a user's PAP and/or PPP allows objects to be relevancy ranked on a per user basis for a given context of the user, thereby determining the relevance of a particular object to a user for a given contextual state, representing an object's personalised relevancy ranking (PAR). Objects of information and/or knowledge are analysed using techniques including but not limited to natural language processing to extract concepts relating to predetermined concepts within knowledge domain describing vocabularies (ontologies). It is concept or plurality of concepts describing an object that are reasoned with, and in conjunction, with the user's PAP and/or PPP to determine the object's PAR. Such reasoning can occur on a continuous, or substantially continuous, periodic, or event driven basis. The variance of PAP with changes of context and the variance of PPP with changes to a user's psychometrics, result in changes of an object's PAR with variance in PAP, PPP, or combinations thereof. An object's PAR and its semantic metadata representation can be shared through a system API.

In certain embodiments, the PAR for an object may be unique to the individual user and may be affected by the user's PAP (context) and/or PPP (psychometrics).

Certain embodiments detail the device utilised by the user when using certain disclosed systems. The device can be a stand-alone, handheld device, a wearable device, or one that is implanted. Furthermore, the device contains a psychometric system that interacts, or partially interacts, with the user's knowledge, abilities, attitudes, personality or combinations thereof to provide input to the method(s) used to determine PPP. One such exemplary device is one that is wearable on the user with non-invasive, or partially invasive, body sensors for one, or a combination thereof of the input and/or output modalities. Body sensors can use various mechanisms relating to electro, mechanical, motion, or combinations thereof to interface the body to the sensor and vice-versa.

Certain embodiments may include the organisation of relevant or selected objects (information and/or knowledge) into containers. These containers may contain various types of objects the system supports (e.g. email, RSS, wave, document information, etc.) within the contextual states of the system. One or more containers may exist within each contextual state. Containers may be categorised by concepts mapped to them. Therefore objects from within a particular contextual state that contain particular concepts may be mapped into a container based on a user's PAP for this state. In certain embodiments, a container may contain a mesh of all objects relating to a particular set of concepts bound by a particular contextual state. In a further aspect, containers based on particular concepts can be created by a user, or can be recommended by the system to a user. This recommendation is made in considering the priorities, interests, preferences, social context, or combinations thereof of a user as outlined within their PAP for this contextual state. Additionally, containers may contain various policies that define ownership of the container, privacy constraints, sharing and collaboration rules, or combinations thereof. Interaction's with objects within the container can be governed by these policies. In addition, container economies may be created by container owners and/or participants such that objects can be traded within and/or across containers. Users of containers may set goals for the container to achieve, with the system then working towards meeting such goals. For example, a container may be created representative of particular concepts mapped into it, and the container can be assigned a goal to search for people, information, knowledge, data or combinations thereof around such concepts until a certain metric is reached. This example relates to an agent based search around concepts that can trigger goal achievement.

In certain aspects, objects within these containers may be sorted based on various mechanisms, for example, around the type of object, relevancy of information within the objects, objects from a certain person(s), time of object creation, location of object creation or where the object currently resides, or combination of these mechanisms. Additionally, sorting may be influenced by the current contextual state of operation. Therefore containers with the same concepts could be sorted differently based on contextual information at the time of consuming contents within a container. In addition, contextual states can influence sorting of objects, for example but not limited to aspects including, the location of the user, current time, the device being used to access the container, and/or the social context/connections of the user.

In certain embodiments, a system may continually, substantially continuously, periodically, or based on recognised concept map events, or combinations thereof, assess the concept mapping between various containers to subsequently alert users and/or agents of possible opportunities for value creation based on concept matches or similarities. This inter-container concept assessment allows the system to recommend to the user affinities between users occurring within the system, people occurring external to the system, user(s) and/or people with similar interests, user(s) and/or people that are experts on particular concepts, innovation opportunities, collaboration recommendations, or combinations thereof.

In certain aspects, the containers within the system may retain all objects, substantially all objects or a subset of objects and the interactions related to these objects over time. This provides a form of knowledge retention capability for the user so that a user can navigate between various containers without losing their knowledge or position within a particular container.

In certain embodiments, the system may interface to social media repositories. The system can map such un-structured, semi-structured, or structured, or combinations thereof, social media into the system. The system can determine PAR for such social media. As part of this process, the system may perform analysis of the social media to annotate the content of the media thereby allowing semantic metadata to be derived to further describe the social media object.

In certain embodiments, the system may interface to social networks and extract objects from within such networks. The system can map such un-structured, semi-structured, or structured objects, or combinations thereof, into the system. The system can determine PAR for such objects. As part of this process, the system may perform analysis of the object based on predetermined parameters thereby allowing semantic metadata to be derived to further describe the object.

Certain embodiments may utilise the broadcast benefits of an asymmetrical social network whereby relationships between users are not symmetrical. A user can share a new piece of information or interact with a particular user and/or agent that may have experience, expertise and/or affinity around a particular concept, whereby the system delivers this new piece of information or interaction to another user and/or agent without a close order/degree of separation (i.e. first or second degree relationship) or following within the system interfaced social network(s). This allows the user to access the breadth of the system's known social graph(s) without having the necessary connections, followings or tenure currently established.

Certain embodiments may use social collaboration. Social collaboration may create a collaborative environment for creating, sharing and/or distilling information. It may place an awareness on common knowledge and the relevant spread between users of knowledge under context within the system. Social collaboration focuses, for example, on the integration of semantic wikis, blogs, collaborative bookmarking and/or social search. Other forms of information may also be integrated, for example, social networks, forums, micro blogs, or enterprise collaboration services. Social collaboration may be a loosely coupled collaboration whereby it is loosely tied to concepts (ontologies) within the semantic engine facilitating ad-hoc, unrestricted, yet relevant knowledge sharing.

Accordingly, information and/or knowledge is continuously, or substantially continuously shared, negotiated and/or conversed (via conversations) amongst connected and like users. Social collaboration facilitates information and/or knowledge exploitation (determining context of existing knowledge and/or information) and knowledge and/or information exploration (new information and/or knowledge discovery). Information and/or knowledge discovery can be performed by users and/or agents that search for information and/or knowledge representative of particular domain concepts within available data sources. In a further aspect of social collaboration, a user can create a "collaborative workspace". Collaborative workspaces allow users to create areas around particular topics of interest that can then be socially interacted within. These workspaces may exist in a container within the system or as a link to an external workspace (e.g. a wiki).

Certain embodiments may link a person's PAP and/or PPP to a virtual sphere of knowledge, information and/or objects such as a "place" that has been visited or passed through by users, agents and/or objects. This virtual sphere can be formed within a container that can be spatially bound and/or linked to contextual state(s). An example of such a spatially bound container could be a library or a class room or a company's research and development office such that information objects, interactions, collaborations, search, discovery or creation, or combinations thereof, are personally ranked for each user with the spatial bounding taken into consideration. Furthermore, this spatial bounding can take the form of a virtual spatial bounding such that information objects, interactions, collaborations, search, discovery or creation, or combinations thereof, appear within the container spatially relative to each other, but not fixed to an absolute geographic spatial reference. When containers are bound by location, whether it is virtual or physical, the user experience may be one of augmented reality. Access to such containers may be controlled by the policies of the container, allowing spatial transaction control to be delivered by the MarketPlace.

In certain embodiments, a user may seamlessly, or substantially seamlessly, link their profiles to one or many social networks. Profile information may be transparent, or semi-transparent between the system and the social networks linked to. Through various social network and/or data portability initiatives, a user's profile data and/or social graph position may be available to the system. Social connect as an embodiment works such that people and information can be interconnected components of the system. As such, person-to-person communications and/or person-centric operations are important aspects in determining a user's PAP and an object's PAR. Social connect may be coupled to social collaboration embodiments so to enable a people-centred knowledge management approach focusing on social processes. The social connect concept may also be formed around distributed methodologies such that the management of the social relationships may be exposed to external sites and/or services whereby the connections between people can be provisioned with context and/or a user's PAP. This may expose the dynamic context and/or relevance of the interconnection to a third party application and/or site.

In certain embodiments, ontology based annotation, semantic text analysis (natural language processing), reasoning techniques or combination thereof are used to generate semantic metadata for knowledge, information and/or objects. This semantic metadata may directly link to concepts within containers. This metadata can allow information silos to communicate with each other via compatible knowledge models (ontologies). It can allow intelligent agent(s) to transverse such silos in search of knowledge and/or information that is relevant to a user's PAP. Through semantic annotation, artefacts (social objects, people, etc.) can be referenced by concepts defined within ontological models within the system, thereby allowing inferencing to be performed whereby automated or semi-automated, reasoning can infer new, implicit information on what has already been asserted in an explicit manner. Semantic text analysis can be employed to perform linguistic and/or statistical processing functions on the textual content of knowledge artefacts within the system in order to perform named entity recognition and/or term classification. Such text analysis can also determine content summarisation, topic recognition, noun/phrase extraction, or combinations thereof. In addition, predetermined dimensional analysis of the text can determine the tone of the text, the demographic or target audience of the text, the interest of the target audience within the text, the language of the text, or combinations thereof. This analysis provides resources that be subsequently used to determine object relevancy.

In a further aspect, a system or method can be used to determine semantic metadata and concepts representative of a user's content within their storage devices including, but not limited to mediums of hard drives, CD/DVD's, memory sticks, etc. and across some or all of a user's devices. The system can concept map knowledge, information and/or objects from within these mediums into contextual state and subsequently containers. Additionally, corporate/enterprise information repositories can be concept mapped using the system to assist with knowledge retention. Such concept mapping can map concepts to users (through information ownership or referencing within) and can subsequently be used by the system to look for concept expertise and/or affinities. Mapping objects with known concepts into corporate/enterprise containers can allow smart interaction by users of a container such that users from within both a corporate internal environment as well as its customers, suppliers, marketing intermediaries, or any other related party can interact within the container providing seamless, or substantially seamless, data integration as well as contextual business processes leveraged directly or indirectly in the collaborative interactions of the participants.

In certain embodiments, a personalised relevancy interface is established, which adaptively displays information and/or knowledge objects. A user creates contextual states representative of certain environmental and user associations' representative of the desired state. Within each contextual state, the user defines one or a plurality of containers representative of concepts of interest under the particular contextual state. A user browses through a plurality of objects with a container, with objects ordered by PAR. A user can execute action(s) associated with each object further relating, but not limited to, search, discovery, collaboration, sharing, interaction, rating, marking for favourite, or combinations thereof.

In certain embodiments, techniques are presented to overcome the current problem with the approach to online search, which lacks personalised relevancy ordering of the results. A contextual search system utilises a user's PAP to rank all aspects, or substantially all aspects, of information, knowledge, or interactions, or combinations thereof, within the system such that each object has a unique PAR, specific to the user. An object with a higher PAR indicates that at such point in time, and given the user's current contextual state, this object is of higher relevancy to the user. Typically this would indicate this object should be presented within the user's personalised relevancy interface at a higher order of focus or priority. The contextual search system can also allow a user to perform traditional text based search whereby the user's search query can be adapted to better match a user's current contextual state as represented by PAP.

In certain embodiments, a system interfaces to, and utilises enterprise information and/or personal information management tools. This allows, for example, tasks, contacts, calendar information and/or messaging (email, Waves, etc.), or combinations thereof, to be synchronised, or partially synchronised. Such objects can be semantically annotated within the system so that such objects can be accessible through the personalised relevancy interface. Such objects can be ordered within this interface according to their determined relevancy. This embodiment allows users to have their enterprise information and/or personal information organised in containers within contextual states of the system.

In certain embodiments, a system further comprises of a conversation manager. Conversations can be formed from any combination of communication mediums within the system, or interfaced to by the system. Objects within a conversation include the users, information/media, knowledge and/or services, or combinations thereof, within the conversation. Conversations that are related by such aspects including but not limited to concept within a conversation, participants, communication groups etc. can be formed together as threads within containers, either by the system and/or the user using functions within the conversation manager. Conversations can be of a decentralised nature whereby they can occur across multiple channels and/or communities both within and/or external to the system. PAR of each conversation object can be determined and used to deliver relevancy for such objects within the personalised relevancy interface. The bearer of conversations can be any communication medium supported by the user's device being used to access the system. Conversations within the system can be viewed as a threaded stream such that relationships between conversation threads can be easily navigated within the personalised relevancy interface. Conversations within the system can take many different forms. For example, a conversation could be as simple as microblogging. Another form of conversation could be a conversation about a particular topic contained within a container of a contextual state whereby users from various disciplines within a company participate via the same and/or different conversation bearers. Another example could be the conversational interaction between the user and a particularly service within the personalised relevancy interface. Conversations can also be used as a mechanism the system uses to notify users of newly available and/or relevant objects.

In certain embodiments, a system can utilise semantically enabled Intelligent Agents (SIA). An SIA is defined as an entity which observes and acts upon an environment and directs its activity towards achieving goals (i.e. it is rational), whereby its actions, functions and goals are described through one or more ontologies. The system uses one or many SIAs to learn and acquire knowledge and/or information to assist a user to meet their interests, priorities, and goals. The SIAs can harvest knowledge and interact with external data silos such that, when certain conditions and/or goals are met within a data silo, a predetermined action is triggered within the system. This action can be of many forms including (but not limited to) interaction with conversations or harvesting of new additional knowledge. An SIA may harvest and/or interact around particular concepts within containers. This allows SIAs to act as goal agents within containers to work towards achieving goals set by the user to assist with knowledge discovery and/or retention, knowledge acquisition, and focused attention.

In certain embodiments, a system utilises the function of "breadcrumbing" whereby information, in the forth of addition annotated data representing the interactions a user has with objects, can be placed within the semantic data of the system. This additional annotated data represents historically interactions relating to the object by one or more users. This provides a means for statistical inferencing to predict future interactions and relevancy conditions for a user or an object. One such example is spatial "breadcrumbing" to monitor geospatial trends, whereby semantic data can be geospatially referenced with additional annotated data, and thereby used for inferring certain relevancy aspects in the future. Another example relates to trends in PAP and/or PAR around certain knowledge pools and users.

In certain embodiments, a system utilises detailed domain knowledge of all, or substantially all, devices accessing the system. The characteristics and/or capabilities of such devices can provide some of the system inputs to control the contextual behaviour within the system. User usage patterns can be captured within the system and subsequently influence contextual behaviour accordingly.

In certain embodiments, semantic based policy and/or privacy management is described where concept based policy and/or privacy management can be defined around particular objects within the system. This allows policy frameworks to be deployed so that social collaboration, interaction and/or knowledge/information discovery can be governed by such policies.

In certain embodiments, a system further supports an interaction based transaction economy within a marketplace, with the marketplace adaptively adjusting service and/or product offered to a user in a container within a contextual state in a relevant manner based on a user's PPP and the service and/or product's PAR. Within this system, resides an ontology based economy that is based on certain parameters, including but not limited to attention models and transaction models. Concepts describing products and/or services can be defined within such ontologies within the system and subsequently interconnected into the overall domain concepts. Such concept instances occurring within product and/or service objects are subsequently given a PAR for each user, and are therefore ranked for relevancy like other objects within the system.

In certain embodiments, a system can utilise a user's PPP to provide feedback on personal development. The system can correlate goals, thinking style, innovation style, communication style, or collaboration styles, or combinations thereof, coupled with the user's PPP to learn aspects of a user's behaviour within different containers under different contextual states. It can gain inputs from the a large corpus of online information, work performed within the system by the user, and the user's interaction within the system including but not limited to user physical attributes such as voice, typing styles, eye movement, concept preferences within containers, social relationships, goals set within containers and the associated interaction, conversation and/or collaboration, or combinations thereof, to provide feedback on personal development to the user. Such inputs can be semantically annotated, allowing the system to predict future patterns of behaviour, thereby determining personal development feedback. This feedback may or may not have otherwise been discovered by the user. Additionally, products and/or services can be recommended to the user within the personalised relevancy interface to further promote personal development.

In certain embodiments, a system utilises entire, or substantially the entire corpus of knowledge known to the system in conjunction with the system users' PPPs to create simulated creative thinking models around users' psychometric profiles and system based profiles, whereby the system can semi-automatically or automatically create new knowledge.

In certain embodiments, a system(s) is disclosed for providing information to at least one of a plurality of users, the system ordering the information based on the attention ranking of the information relevancy, an interface for interfacing with at least one online data and/or stored user data; a processor executing an application to analyse information derived or inferred at least in part from the online data and stored user data; a relevance engine having inputs from the application and at least one of the following outputs, an output to deliver attention profiles, an output to deliver psychometric profiles; a database storing at least in part data relating to inputs and outputs of the relevance engine and application, wherein the relevance engine further comprises an output to deliver attention rankings and wherein the relevance engine ranks the information based at least in part on one or more of the outputs.

In certain aspects, the interface further comprises one or a plurality of interfaces to data using extensible standardised formats, proprietary formats, or combinations thereof; a harvesting or mining function for collecting data in its native format; a software agent component including a plurality of intelligent agents, each able to traverse data sources; a portability function to manage data portability between the system and interfaced entities; and a publishing function to manage information publishing into interfaced entities, wherein interfaced entities include online information, online communities, online systems, user stored data, or combinations thereof. In certain aspects, the standardised formats further comprise REST, SOAP, RSS, Atom, XMPP, SPARQL or equivalent. In certain aspects, the harvesting or mining includes means of filtering and/or conditioning data.

In certain aspects, the intelligent agent further comprises configurable parameters optimised for each user's information requirements. In certain aspects, the portability component includes means of information or knowledge adaptation, wherein this adaption forms the information or knowledge ready for publishing into interface entities. In certain aspects, the portability component includes mechanisms to protect the privacy of user information or knowledge.

In certain aspects, a location system variable represents the location of a user or the location of an object represented within the system. In certain aspects, a location subsystem further comprises a location broker system that can take input from satellite positioning devices, mobile network location systems, local or short range network location systems, IP based network location systems, and user input location. In certain aspects, the satellite positioning devices are devices which contain global positioning system (GPS) and/or GALILEO satellite positioning technology and which can send the location data from this technology to the system. In certain aspects, the mobile network location systems further comprises assisted GPS, cell-site triangulation technology or equivalent and which can send the location data from this technology to the system. In certain aspects, the local/short range network location systems further comprises Bluetooth, WiFi, and Zigbee technology or equivalent and which can send the location data from this technology to the system. In certain aspects, the IP based network location systems further comprises IP address, MAC address spatial referencing technology or equivalent which map such an address to an absolute location and which can send the location data from this technology to the system. In certain aspects, the user input systems allow the user to input the known location and which can send the location data from this technology to the system. In certain aspects, the various location and positioning systems can send the location data from either the device being located, or the system locating the device. In certain aspects, the heading of a device which contains technology to determine its heading, can be sent to the system. In certain aspects, each location system component is interconnected into the location broker system that determines the most accurate location representation to set as the location system variable. In certain aspects, the location system variable for a user is stored in semantic annotation representation within the database/storage component. In certain aspects, the location system variable for an object is stored in semantic annotation representation within the database/storage component.

In certain aspects, a presence system variable represents the presence of a user within the system. In certain aspects, the presence system variable can be extracted from one or more of a user's online communities. In certain aspects, the presence system variable can be extracted from one or more of a user's online systems. In certain aspects, a current time system variable represents a time reference within the system. In certain aspects, the object time system variable represents a time reference within the system. In certain aspects, the current time system variable is referenced to UTC. In certain aspects, the object time system variable is referenced to UTC.

In certain aspects, wherein the database further comprises a semantic database including a plurality of records, each record descriptive of information derived; and a content store, for storage of content, wherein the semantic database can be a standalone instance, or can be federated within one or more instances interconnected together, and the content store can be a standalone instance, or can be federated within one or more instances interconnected together In certain aspects, a semantic knowledge information management component within the system further comprises an information retrieval component which interfaces to at least one or more structured, un-structured, or semi-structured instances of data; an ontology mapping component which maps concepts discovered within un-structured or semi-structured data into predefined classes, attributes, relations, function terms, restrictions, rules, axioms, and/or events of system ontologies; an ontology repository containing representations of ontologies known to the system, wherein ontologies provide a unified machine-interpretable domain vocabulary of knowledge domains; a natural language processing component which linguistically analyses text within data retrieved via the information retrieval component; an information and knowledge control component which maps data instances of ontologies to form system knowledge; a content recognition component; a spatial intention recognition component; and a temporal recognition and analysis component. In certain aspects, the information retrieval component conditions the data where necessary, and presents it for concept mapping.

In certain aspects, the concept or concepts discovered and/or extracted from data are stored within one or more indexes within the system with their associated link(s) (e.g. URL, URI etc.) to the data. In certain aspects, the index or indexes are searchable. In certain aspects, the indexes represent a concept to data object map whereby a single concept can link to one or more data objects. In certain aspects, the relevance engine utilises the index or indexes to determine data object(s) that are representative of one or more concepts. In certain aspects, the relevance engine compares indexed concepts with a concept or concepts from a user's PAP to determine PAR for the data object or objects linked to the concept or concepts. In certain aspects, the indexes can be created from an entity or entities discovered and/or extracted from data including but not limited to term classification; content summarisation; topic recognition; noun phrase extraction, tone of the text; the demographic or target audience of the text; the interests of the target audience within the text; and the language of the text, or combinations thereof. In certain aspects, entity extraction can be performed using semantic extraction. In certain aspects, the relevance engine utilises the indexes to determine data objects that are representative of one or more entities. In certain aspects, the relevance engine compares indexed entities with an entity or entities from a user's PAP to determine PAR for the data object or objects linked to the entity or entities.

In certain aspects, the information retrieval component is adaptable to recognise new data sources of information. In certain aspects, the information retrieval component is adaptable to condition new data sources of information. In certain aspects, the information retrieval component further comprises of an intelligent agent or plurality of intelligent agents having the ability to traverse information data silos in search of information considered relevant to the system or user based on goals set of the intelligent agent by the system or user. In certain aspects, the information retrieval component further comprises link processing to retrieve information addressable by a URI link. In certain aspects, the link processing further comprises the ability to process links nested within content representative of the parent link to a system configurable link depth.

In certain aspects, the ontology mapping component further comprises of predetermined concept mapping to map information retrieved with classes, attributes, relations, function terms, restrictions, rules, axioms, and/or events of system ontologies. In certain aspects, the predetermined concept mapping of the system is extensible to support inclusion of new system ontologies and/or new information types. In certain aspects, the ontology repository component can store the entire ontology representation within or reference an external representation of the ontology. In certain aspects, the new ontology representations can be added to the ontology repository component. In certain aspects, the ontology repository, relationships can be created between classes, attributes, relations, function terms, restrictions, rules, axioms, and/or events of a plurality of system ontologies. In certain aspects, the relationships can be represented using the Web Ontology Language OWL. In certain aspects, the relationships can be represented using the Probability Web Ontology Language PR-OWL to place weights on the relative importance of relationships. In certain aspects, the weights can be different for each user. In certain aspects, representations of contextual ontologies are stored within the ontology repository. In certain aspects, data instances of the contextual ontologies are stored in the semantic database.

In certain aspects, a contextual ontology further comprising of social relationships and personal information, and is represented by the FOAF ontology. In certain aspects, a contextual ontology further comprising of socially interconnected community information and is represented by the SIOC ontology. In certain aspects, the SOIC ontology interconnects conversations within communities existing both internal and external to the system. In certain aspects, a contextual ontology further comprising of user attention profile information and is represented by the UAP ontology. In certain aspects, a contextual ontology further comprising of device information and is represented by the DEV ontology. In certain aspects, a contextual ontology further comprising of knowledge mapping information and is represented by the SKOS ontology. In certain aspects, a contextual ontology further comprising of temporal information. In certain aspects, a contextual ontology further comprising of spatial information and is represented by the Geonames ontology.

In certain aspects, a contextual ontology further comprising of service information. The contextual ontology utilises the Web Ontology Services Language OWL-S to represent supported services within the system. The supported services represented are described by three parts, further comprising a service profile describing what the service does, whereby the service profile is human readable and includes the service name and description, limitations on applicability and quality of service, and/or service publisher information; a process model describing how a user can interact with the service including descriptions of sets of inputs, outputs, pre-conditions and/or results of service execution; and a service grounding describing the details needed by a user to interact with the service.

In certain aspects, the natural language processing component further comprises functions for: named entity recognition; term classification; content summarisation; topic recognition; and noun phrase extraction, whereby to further analyse the text. In certain aspects, the natural language processing component further comprises of analysis to recognise a category representative of the text by a predetermined dimension. In certain aspects, the predetermined dimension further comprises the tone of the text; the demographic or target audience of the text; the interests of the target audience within the text; and the language of the text.

In certain aspects, the natural language processing component creates semantic metadata representative of concepts, entities, categorises and terms found within the text.

In certain aspects, the information and knowledge control component stores, retrieves, queries, modifies and/or deletes information and knowledge within the database/storage component. In certain aspects, the information and knowledge control component further comprises a knowledge bank which includes a virtual layer for indexing and mapping knowledge within the system. In certain aspects, the information and knowledge control component further comprises a knowledge transaction management subsystem which controls knowledge transactions and interactions within the system.

In certain aspects, the knowledge transaction management subsystem utilises a transaction model to control the transactions and interactions. In certain aspects, the transaction model can be an instance or a plurality of instances for each instance of the knowledge and information.

In certain aspects, the content recognition component comprises a content processing component for each type of supported content, and wherein the processing component extracts metadata describing the content. In certain aspects, the content comprises of structured, un-structured, or semi-structured content representative of the degree of metadata already available for the content.

In certain aspects, the spatial intention recognition component comprises a forward prediction subsystem to predict the spatial trajectory of a device connected to the system. In certain aspects, the forward prediction subsystem further comprises short term extrapolation of the device location by analysing previous spatial trajectories within the system to statistically determine the most probably short term trajectory. In certain aspects, the forward prediction subsystem further comprises long term historical extrapolation of the device location by analysing a user's, or a plurality of users' spatial trajectory histories within the system to statistically determine the most probably long term trajectory.

In certain aspects, the temporal recognition and analysis component comprises a system to temporally timestamp data within the system.

In certain aspects, the relevance engine further comprising of relevancy management components that provide interaction, contextual, collaboration, conversation, privacy and knowledge management functions; a behavioural modelling component that generates a user's personalised attention profile and personalised psychometric profile; a relevance framework that generates personalised attention rankings indicating object (information) relevance; and a personalised attention profile component.

In certain aspects, the relevance management components include a context management subsystem providing contextual awareness to the system by means of contextual states whereby personalised attention profiles are bound by such context; a collaborative management subsystem providing means to control collaboration between a plurality of users bound by context; a interaction management subsystem providing means to manage interactions between a plurality of users bound by context, including policy and preferred interaction medium management; a knowledge management subsystem providing means of seeking and capturing information from a user or plurality of users; a privacy management subsystem providing means of controlling access restrictions to information; a social management subsystem providing means for determining trust parameters and social relationship contexts and utilising such aspects in the determination of personalised attention profile; a reasoning/inferencing subsystem provides means to reason with and/or infer information; and an implicit/explicit feedback subsystem providing means for feedback capture between the system and a user or plurality of users.

In certain aspects, the relevance framework include a contextual search subsystem providing means to contextualise search results; semantically linked Bayesian networks providing means to inference information across domain vocabularies through probabilistic influences traversing across semantically interconnected domains; and a relevancy fusion component providing means to formulate ordered lists, for a plurality of users, of information objects based on each object's personalised attention ranking.

In certain aspects, the psychometric profile of a user is determined from assessment of a user's knowledge, cognitive abilities, attitudes, personality or combinations thereof. In certain aspects, the attention profile of a user is determined from assessment of a user's priorities, interests, preferences, social context, or combinations thereof. In certain aspects, the behavioural modelling analyses user interactions with information objects including interpretation of implicit and explicit means of feedback. In certain aspects, the behavioural modelling analyses a plurality of user's personalised attention profile as a means to determine similar minded users.

In certain aspects, the personalised attention ranking given to an information entity is derived from personalised attention profile, personalised psychometric profile, or combinations thereof of a user, and whereby the personalised attention ranking adapts with changes to such profiles of the user.

In certain aspects, the contextual states further comprise a container or plurality of containers comprising a means of clustering information containing a similar concept or concepts. In certain aspects, the container provides a means of containing information objects of similar concepts extracted from such objects and associated objects, and ordered based on the personalised attention ranking of such objects. In certain aspects, the container further comprises a concept or plurality of concepts providing means to associate information objects with containers; a goal or plurality of goals providing means to control search for people, information, knowledge, data or combinations thereof certain metric is reached; a policy or plurality of policies providing means to control collaboration, interaction, access functions or combinations thereof; and a privacy function providing means to restrict access to aspects of the container. In certain aspects, a container or plurality of containers associated with a user can be interconnected to a container or a plurality of containers of another user bound by policy, authority, privacy parameters or combinations thereof set by the users.

In certain aspects, interconnections between containers provide a means for flow of information between containers. In certain aspects, the interconnections between containers provide means for determining affinity, experience, expertise, or combinations thereof between users.

In certain aspects, a personalised relevancy interface to graphically represent and adaptively order information based on personalised attention ranking. In certain aspects, the personalised relevancy interface provides a means of presenting actions or interactions associated with information objects being presented, thereby allowing the user to perform such actions or interactions to information including but not limited to discover, search, share, collaborate with, rate, modify, create new, or combinations thereof.

In certain aspects, a marketplace providing means for an interaction based transaction economy using ontology based concept-to-product or concept-to-service matching, whereby a personalised attention ranking is determined for a product or service object or plurality of products or services objects. In certain aspects, the objects can be associated with containers through concept mapping, thereby objects can be presented within the personalised relevancy interface.

In certain aspects, a user of the system can interface to one or more instances of online information. In certain aspects, the online information further comprises at least part of one or more social network, social media, online forums, wilds, blogs, feeds, micro-blogs, enterprise systems, personal information management systems, or linked data. In certain aspects, metadata and/or contextual information accessible within the online information is retrieved via the semantic knowledge information management component.

In certain aspects, a user of the system can interface to one or more instances of online systems. In certain aspects, the online systems further comprises at least part of one or more Google Waves, blogs, email, calendar, tasks, contacts, journals, collaborative systems, document sharing systems, or conversation systems. In certain aspects, metadata and/or contextual information accessible within the online systems is retrieved via the semantic knowledge information management component. In certain aspects, the online system resides behind a firewall. In certain aspects, the online systems can be mapped to one or many user configured contextual states within the system.

In certain aspects, a user of the system can interface to one or more instances of user stored data. In certain aspects, the user stored data further comprises at least part of one or more documents, spreadsheets, multimedia, presentations, or application data. In certain aspects, the user stored data resides on a device further comprising memory; a processor or plurality of processors; an operating system; and a network interface or plurality of network interfaces, wherein the user stored data can be extracted via the network interface for processing within the system. In certain aspects, metadata and/or contextual information accessible within the user stored data is retrieved via the semantic knowledge information management component. In certain aspects, the data can be temporally indexed. In certain aspects, the data can be spatially indexed. In certain aspects, the data can be at least part of one or more structured, un-structured or semi-structured.

In certain aspects, a system API wherein a least part of one or more user's personalised attention profile, user's personalised psychometric profile, object's personalised attention ranking or a user's knowledge profile are accessible. In certain aspects, the system API further comprises of functions to extract and/or inject data out and/or into the system. In certain aspects, the system API is specific and language independent. In certain aspects, access to the system API is controlled by the system administrator.

In certain aspects, one, many, parts of, or all modules/ components within the system can reside within a cloud computing architecture, either within the same data centre or distributed across one or more data centres.

In certain aspects, the service can be deployed in a multiplicity of configurations comprising at least one or more remote server, distributed across real and virtual servers, cloud computing, or hosting services.

In certain embodiments, a method(s) is disclosed for ranking information, the method comprising interfacing with at least one online data and stored user data; analysis of information derived or inferred at least in part from the online data and stored user data; storing at least in part information relating to at least online data, stored user data, and analysis output; and calculation of an attention ranking of the information. In certain aspects, the analysis of information comprises steps of retrieving at least part of one or more structured, un-structured, or semi-structured information from online data or stored user data; natural language processing of information to extract at least one concept; and mapping of at least one concept into at least part of one or more ontologies. In certain aspects, the retrieved data is conditioned. In certain aspects, the method further comprises computation of a user's psychometric profile determined at least in part by analysis of one or more of a user's knowledge, cognitive abilities, attitudes, or personality. In certain aspects, the method further comprises computation of a user's attention profile determined at least in part by analysis of one or more of a user's priorities, interests, preferences, or social context.

In certain aspects, the calculation of an attention ranking is performed at least in part by reasoning of a least part of one attention profile or psychometric profile with information to calculate the attention ranking. In certain aspects, the method further comprises ordering information within a relevancy interface, wherein the ordering of the information is based on the attention ranking of each piece of information.

In certain embodiments, a system(s) is disclosed comprising a processor; a memory; a operating system; a communications connection; one or a plurality of input modalities for device system to user; one or a plurality of output modalities; an interconnection mechanism coupling at least in part one or more processor, memory, communications connection, input modalities, output modalities. In certain aspects, the memory is encoded with an application for capturing at least in part one or more user action, interaction, or stored user data.

In certain aspects, the system further comprises transmission of application data using the communications connection to a system capable of receiving such application data. In certain aspects, the application further comprises at least one or more functions to analyse at least in part one of a user's priorities, interests, preferences or social context. In certain aspects, the application further comprises at least one or more functions to analyse at least in part one of a user's knowledge, cognitive ability, attitude or personality. In certain aspects, the application further comprises at least one or more functions to receive information or attention rankings.

In certain aspects, the device system further comprising generating a relevancy interface. In certain aspects, the relevancy interface orders information based on attention ranking. In certain aspects, the relevancy interface further provides a means of presenting one or more user actions associated with information, thereby allowing the user to select a user action. In certain aspects, the user action provides functional means of at least one or more functions to discover new information, search for information, share information, collaborate with information, rate information, modify information, create new information, or combinations thereof.

It is to be understood that the embodiments disclosed can be embodied as a software program, as software and hardware, as hardware and/or circuitry alone, such as within a data communications device or combinations thereof. Certain features of the disclosed embodiment, as explained herein, may be employed in data communications devices and/or software systems.

It is to also be understood that certain embodiments may be embodied within or partially within a cloud computing system. The concept of cloud computing refers to the utilisation of a set of shared computing resources (e.g. servers) which are typically consolidated in one or more data centres.

Certain embodiments can operate as machine readable code, this code may reside on a Server, Personal Computer, larger computer, smaller computer, a mobile device (such as a PDA or iPhone), or within, or partially within a cloud computing architecture.

BRIEF DESCRIPTION OF THE DRAWINGS

Additional features and advantages of the present disclosure will become apparent from the detailed description of the embodiments in conjunction with the accompanying drawings.

FIG. 12 is an example of a Geonames ontology instance, in accordance with certain embodiments.

FIG. 13 is an example of a SIOC ontology instance, in accordance with certain embodiments.

FIG. 14 is an example of an APML instance, in accordance with certain embodiments.

DETAILED DESCRIPTION

Figure 1:
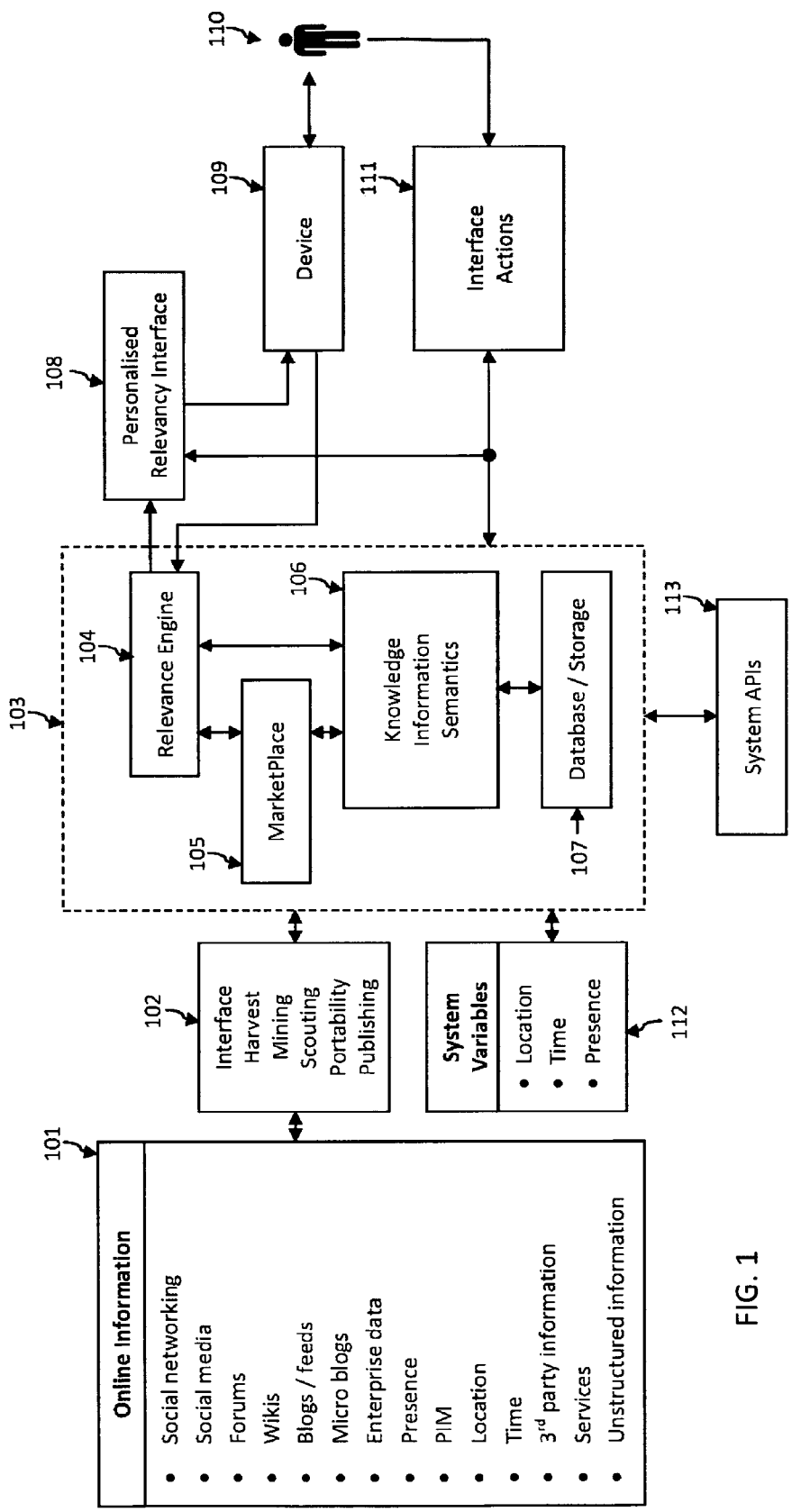
FIG. 1 is a block diagram illustrating an exemplar high level overview of a system framework, in accordance with certain embodiments.

The present disclosure will be described in conjunction with certain exemplar embodiments, however, it will be understood that they are not intended to limit the scope of these embodiments. On the contrary, the present disclosure is intended to cover alternatives, modifications and equivalents, which may be included within the spirit and scope of the disclosure. Furthermore, in the following detailed description numerous specific details are set forth in order to provide a thorough understanding of the present disclosure. However, it will be obvious to one of ordinary skill in the art that certain embodiments may be practised without these specific details.

Some portions of the detailed descriptions which follow are presented in terms of procedures, logic blocks, processing and other symbolic representation of operations on data bits within a computer system or electronic computing device.

These descriptions and representations are the means used by those skilled in the data processing arts to most effectively convey the substance of their work to others skilled in the art. A procedure, logic block, process, etc., is herein, in generally, conceived to be a self-sequence of steps or instructions leading to a desired result.

The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present inventions.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present disclosure, discussions utilising terms such as "generating" or "modifying" or "retrieving" or the like refer to the action and processes of a computer system, or similar electronic computing device that manipulates and transforms data. For example, the data is represented as physical (electronic) quantities within the computer system's registers and memories and is transformed into other data similarly represented as physical quantities within the computer system memories or registers or other such information storage, transmission, or display devices.

The methods and/or systems disclosed are not limited to a particular computer platform, particular processor, or particular high-level programming language. Additionally, the computer system may be a multiprocessor computer system or may include multiple computers connected over a computer network. It should be understood that each module or step shown in the system framework may correspond to separate modules of a computer program, or may be separate computer programs. Such modules may be operable on separate computers.

FIG. 1 depicts the high level system architecture, according to certain embodiments. Each component within the architecture is loosely coupled. A loosely coupled architecture refers to an approach of designing interfaces across modules to reduce the interdependencies across modules or components thereby reducing the risk that changes within one module will create unanticipated changes within other modules. This approach seeks to increase flexibility in adding modules, replacing modules and/or changing operations within individual modules. Furthermore, it allows various components to be implemented within a cloud computing environment to allow the system to exhibit scalability (e.g. dynamically increase or decrease the deployment hardware resource utilisation as needed), performance (e.g. execute efficiently and fast), and reliability (e.g. rarely fail).

Component 101 represents the online information the system interfaces with. This information includes, but is not limited to, social networks, social media, forums, wikis, blogs, feeds, micro-blogs, enterprise systems, presence systems, personal information management (PIM) systems, location determination systems, time references, third party linked data, services, open/linked data and/or unstructured data. Information from 101 is interfaced to by component 102, the Data Interface Layer. Component 102 harvests this information through data mining and/or scouting capabilities. Component 102 also controls portability of data within the system and/or publishing of information to online information sources described by 101.

Component 103 performs the storage layer 107, the knowledge/information semantics layer 106, and the relevance engine 104. Additionally it contains the MarketPlace 105.

Storage layer 107 contains semantic stores and blob stores used to store semantic data and/or pieces (blobs) of information. Various aspects of 107 can reside within a cloud computing architecture. Storage layer 107 also contains an abstraction layer such that portability between cloud solutions is possible.

Knowledge/information semantics layer 106 performs multiple tasks including but not limited to the following. Firstly it manages the system wide ontologies which are stored within an Ontology Repository. Secondly it manages information retrieval which extracts information from the Data Interface Layer 102 and determines the best course of action to extract metadata and store accordingly within the Storage Layer 107. Thirdly, it performs the ontology/concept mapping such that unstructured and/or semi-structured data is correctly mapped within supported ontologies within the system.

The metadata extraction sub-system performs several tasks depending on the nature of the information being processed. It can support Natural Language Processing (NLP) which analyses text within the information to extract key semantic linguistic information and/or concepts about this text. It can also perform content recognition which extracts metadata from within content itself. This content recognition analyses the actual content and determines the context of the content, for example but not limited to, facial recognition, spatial recognition and/or image recognition.

Information that is captured within the knowledge/information semantics layer 106 can be temporally and/or spatially tagged.

Relevance engine 104 contains the relevance framework system containing semantically linked Bayesian networks and/or systems that control social network analysis, system feedback, collaborative management, context management, privacy management, knowledge management, conversation management and/or interaction management. This layer can also include reasoning and/or inferencing functions. Furthermore, the relevance engine 104 can contain the behavioural modelling sub-system for determining a user's PAP. The relevance engine 104 performs relevancy fusion by ordering information within the interface based on a user's PAP and the PAR of each individual piece of information. The relevance engine 104 then provides this information for use within personalised relevancy interface 108.

Certain system variables including but not limited to time and/or location references can be fed into Component 103 via the System Variables Layer 112.

MarketPlace 105 maps products and services into recognised domain concepts based on the ontologies supported within the knowledge/information semantics layer 106. It manages a transaction economy within the system and has facilities to provided detailed analytics to advertisers and/or marketeers.

The Personalised Relevancy Interface component 108 hides the complexity of the underlying system to deliver a personalised relevancy interface to the End User 110. The personalised relevancy interface adapts based on the device being used and learns from the user's interactions providing feedback to the relevance engine 104 providing continual, or substantially continual interface intelligence under any context. Furthermore, interactions between the device and the End User 110 can be multimodal in either input and/or output modalities.

The Device 109 represents a device supported by the system such that the device ontology for this particular device may be resident within the ontology repository within the knowledge/information semantics layer 106 thereby allowing the system to consider the device and its sensors' within the relevance engine 104.

The End User 110 may be a human using the system. The End User 110 interacts with the Personalised Relevancy Interface 108 performing tasks including messaging, search, discovery, collaboration and/or interaction via the Interface Actions component 111. The system can profile the End User 110 by utilising aspects of the system including but not limited to the behavioural modelling sub-system 1102 and can therefore provide a user experience personalised to the End User 110. The Interface Actions sub-system 111 controls actions within the interface including but not limited to concept tagging, collaboration actions, messaging, search and/or discovery.

The System API 113 allows user attention profiles, object ranking, and/or user knowledge profiles can be accessible via the system API at the permission of the user. Additionally, components can be implemented on third party websites and services that utilise PAP, PPP, contextual states and/or the containers from within the system. 113 can be made accessible to various entities including but not limited to authenticated users, companies, developers, advertisers, and/or publishers. It provides a mechanism to extract and/or inject various pieces of information from/to the system.

Figures 2A, 2B:
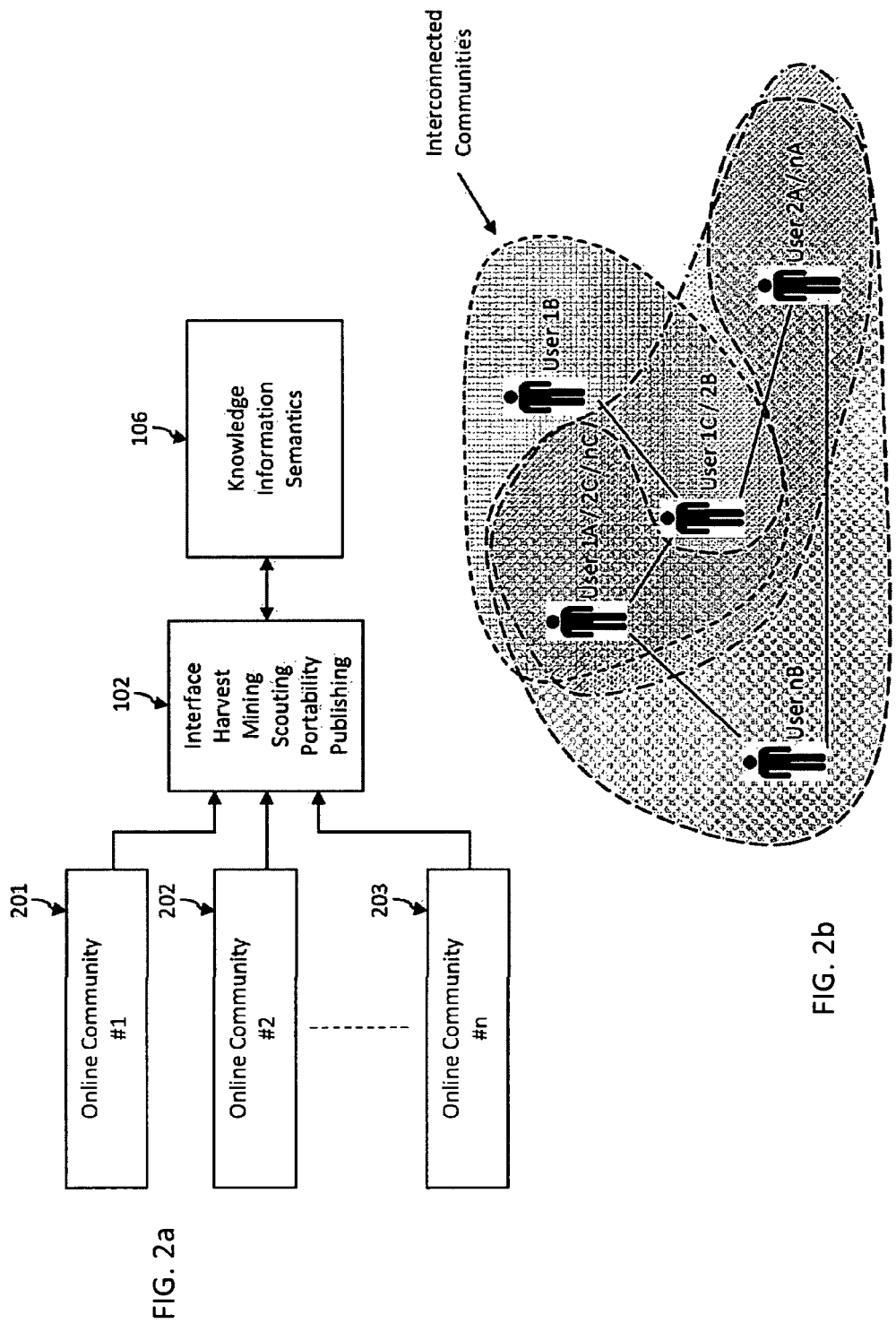
FIG. 2a is a block diagram illustrating the interfacing to online communities (social networks) and the interconnection to the relevance system in accordance with certain embodiments as well as an example in FIG. 2b of the intercommunity unions the system will detect when determining relevance, in accordance with certain embodiments.

FIGS. 2a and 2b show a block diagram illustrating the interfacing to online, dynamic social networks along with a representation of the overlay of multiple online dynamic social networks, according to certain embodiments.

Interfacing to the online communities 201, 202, and 203 is performed by the system component 102. A user can set up their profile within the system to interface to as many online communities as they choose to do so.

System component 102 extracts and/or indexes selected or available information and/or content from within each of the End User's 110 online communities. Should contextual information and/or metadata be available from the online communities, this can also be extracted and/or indexed within the system. Information extraction is performed by the Information Retrieval sub-system 1001. 102 can also harvest this information and/or content for storage within component 107 if possible based on the policy of the online community where the information and/or content is coming from. User connection information may be extracted from the online communities to determine relationships between users for use within the system. Such relationships can cross community boundaries as illustrated in FIG. 2b. User identification techniques can be used to ensure that users are matched between communities via community identification cross referencing. This allows community interconnections to be mapped and used within the contextual states and the relevancy system.

Information, content, contextual information and/or metadata is mapped into the system's stores through the Ontology Mapping sub-system 1002 utilising system ontologies as stored within the Ontology Repository 1007. Interactions, ratings, comments, hash tags and/or recommendations around this information can be captured and used by the relevance engine 104. Relationships from within the online communities can be analysed and/or processed by various sub-systems within the relevance engine 104.

Various pieces of information can be published back into the online communities (201, 202, and/or 203) via component 102 as directed by the user under the Collaborative Management sub-system 1110 and/or the Interaction Management sub-system 1115.

Figure 3:
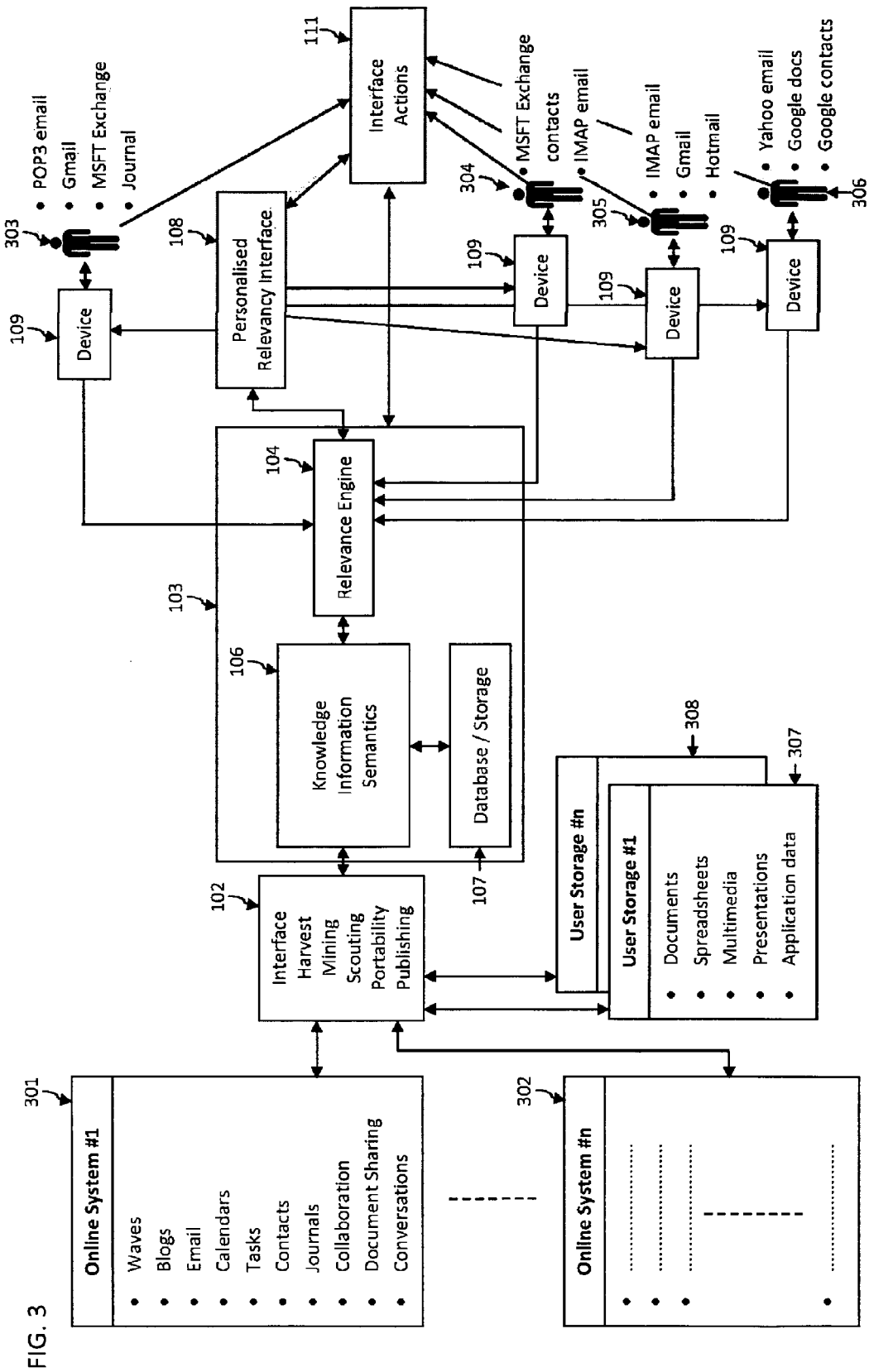
FIG. 3 illustrating various modules in an exemplar enterprise sub-system as well as an example of how each user may utilises a mix of various enterprise functionality, in accordance with certain embodiments.

FIG. 3 is a block diagram illustrating the interface to the user's online functions, for example but not limiting to email, waves, instant messaging, calendar, journal, blogs, tasks, collaboration, document sharing, conversations, contacts, personal information management and/or third party data silos. A user can typically interface to as many online systems as they subscribe to. These systems can include enterprise systems that can be interfaced to from behind corporate/organisation firewalls.

The Online Systems 301, 302, etc. can be mapped into various contextual states within the system with these states being managed by the Context Management sub-system 1111.

Information and/or actions from within these systems can be captured and/or interfaced to so that these can be used by the Interaction Management sub-system 1115.

Interfacing to the Online Systems 301, 302 etc. is performed by the system component 102. System component 102 indexes selected or available information and/or content from within some or all of the End User's 303, 304, 304, 306 online systems. Should contextual information and/or metadata be available from the online systems, this can be extracted and/or indexed within the system. Information extraction is performed by the Information Retrieval sub-system 1001. 102 can also harvest this information and/or content for storage within component 107.

Local information sources can be indexed so that information and/or content within these local stores 307, 308 is passed to the Semantic Knowledge Information system 106 for semantic metadata extraction with the generated concepts stored into the Database/Storage system 107 utilising predetermined system ontologies. This function allows local information of a user that could be residing on their PC, laptop, mobile telephone, MID etc. to be semantically mapped into the system and used within their use of the system such that this information can be reasoned with and/or retained for future use within contextual state containers.

Semantic representation of information from within the Online Systems 301 and/or 302 are used within the relevance engine 104 to derive the Personalised Relevancy Interface 108 based on a user's current contextual state. The information within the Personalised Relevancy Interface 108 is specific to the information relevant for An End User 303, or a plurality of End Users 303, 304, 304, 306, whereby it is personalised for each End User. Various information objects from within the contextual states can be mapped into containers with the containers providing specific information and/or functionality within the contextual state.

Forms of online system information that are either temporally and/or spatially bound, for example, but not limited to calendar entries affect the contextual state relevancy being delivered within the Personalised Relevancy Interface 108.

Figure 4:
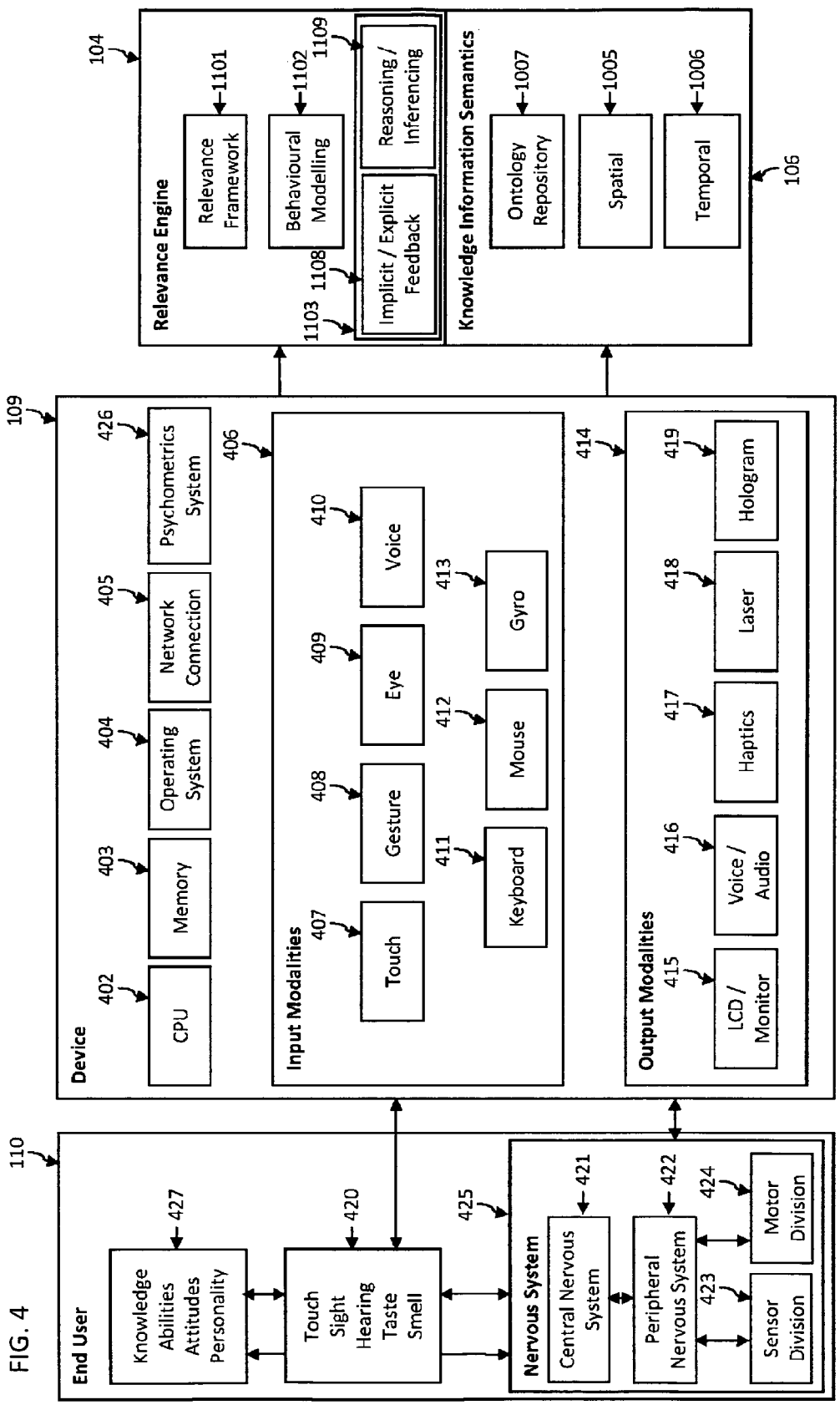
FIG. 4 is a block diagram illustrating various modules in an exemplary device sub-system along with the interaction blocks between the End User and also the system, in accordance with certain embodiments.

FIG. 4 is a block diagram of an embodiment of an exemplary device 109 used in accordance with certain embodiments. It should however be appreciated that the system 109 is not limited to a mobile device. As such, system 109 of these embodiments may be suited to be other types of computing device (for example; portable computing device, desktop computing device, server computer, mobile device, mobile interne device, personal accessory device, etc.). It should also be understood that one or more devices can be connected to the system.

The device 109 comprises of one or more central processors 402, device memory 403, a device operating system 404, an IP based network connection 405 and/or a psychometrics system 426. The network connection can be wired, optical or radio (or mix) supporting technologies for example (but not limited to) such as UMTS, W-CDMA, LTE, WiMAX, WiFi, Zigbee, Bluetooth, LAN. The network connection supports Internet Protocol that can be used to transport information between the device 109, system 103 and further onto the internet and associated online information 101.

The device 109 may also include technology built into it to allow the device to be located to varying degrees of accuracy. The device 109 may optionally have a built in global positioning system or other forms of location determination systems including, but not limited to cell site triangulation.

The device 109 can have multiple input modalities that in combination provide usage patterns and/or feedback via the implicit/explicit feedback sub-system 1108. Sub-system 1108 can store feedback data within the ontology repository 1007. This data can be subsequently used by the relevance framework 1101, the behavioural modelling 1102 and/or the reasoning/inferencing sub-system 1109 within the relevance engine 104. This data can further be used to determine the End User 110 Personalised Personality Profile (PPP). One such embodiment of input modalities include touch sensitive input 407, gesture recognition 408, eye tracking 409, voice control 410, tactile keyboard 411, mouse 412 and accelerometer/gyro 413. Input modalities may further align with human sensory 420.

The device 109 can have multiple output modalities used to provide a means delivering the Personalised Relevancy Interface 108 to the End User 110. These output modalities could include an LCD/monitor 415, voice/audio commands 416, haptics 417 and/or laser/hologram 419. Output modalities may further align with human sensory 420.

Each device supported by the system can be represented by device ontology 1010. An instance of this device ontology 1010 can be referenced within the ontology repository 1007 and subsequently used as a system parameter by the Relevance Framework 1101.

The psychometrics system 426 can interact with the End User 110 psychometrics 427 such that the behavioural modelling sub-system 1102 can utilise this information. The End User 110 attitudes and/or personality is utilised by the behavioural modelling sub-system 1102. The End User 110 knowledge and/or abilities are represented within the Knowledge Information Semantics system 106 through contextual ontologies represented within the ontology repository 1007. The various sub-systems of 1103 interact with the End User 110 to further influence the End User 110 psychometrics 427. The psychometrics system provides data for the calculation of an End User 110 Personalised Psychometric Profile (PPP) and its subset Personal Knowledge, Personal Abilities, Personal Attitudes and/or Personal Personality metrics.

Another variation of the exemplary device 109 can be implanted within the End User 110. In this example, the exemplary device 109 takes the form of a micro/nano machine and could provide modal connectivity of input modalities 406 and output modalities 414 to the End User 110 central nervous system 421 via the peripheral nervous system 422 which in turn takes input/output modalities from the sensory division 423 and/or the motor division 424 of the End User 110 nervous system 425.

Figure 5:
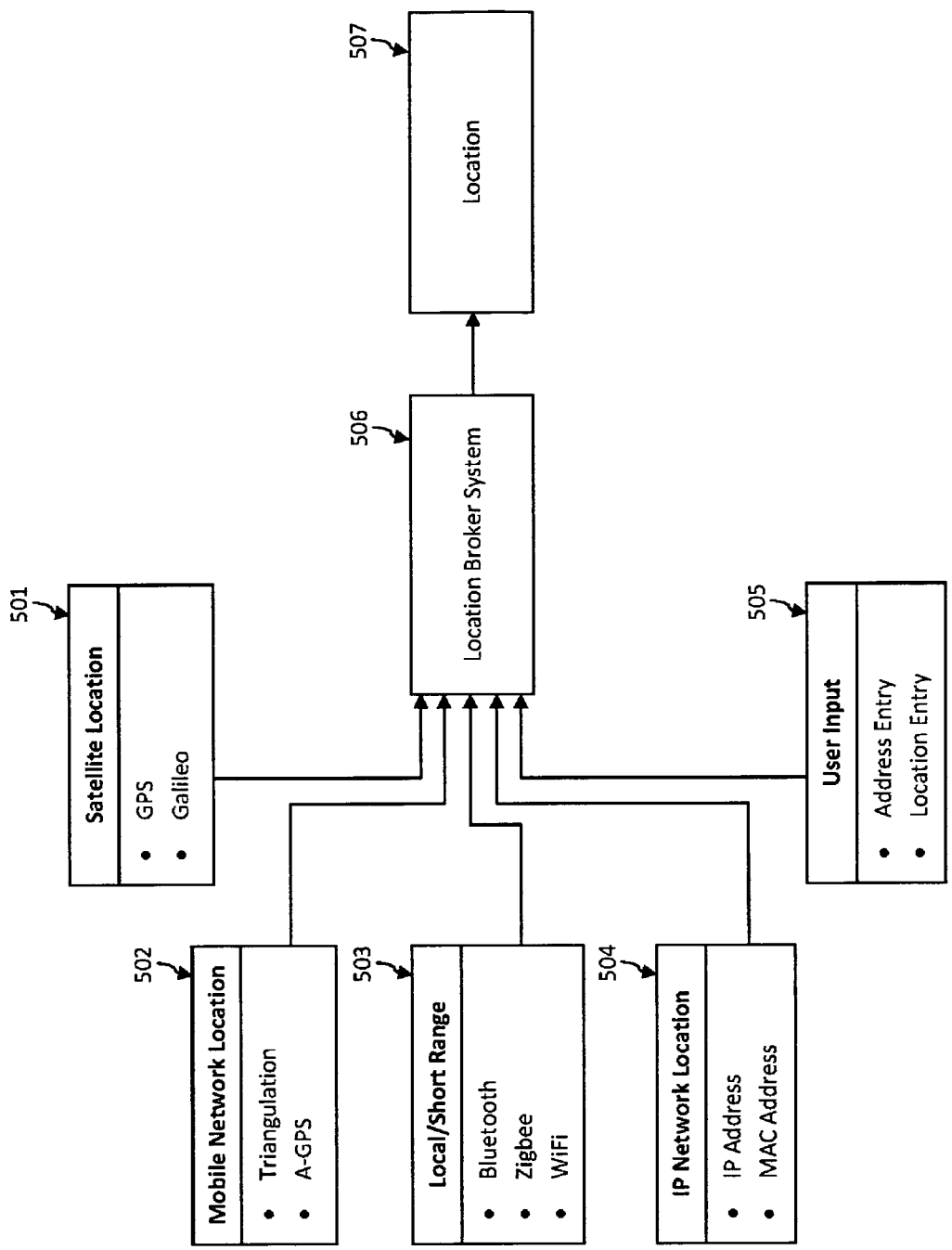
FIG. 5 is a block diagram illustrating various modules in the location sub-system including the location broker sub-system as well as a representation of the different location techniques used to locate a device, in accordance with certain embodiments.

FIG. 5 is a block diagram illustrating the location sub-system. Location is part of the system variables 112. User and/or object location can be published to online information 101 for location sharing in other applications. For the system variable of location within 112, the device's location can be determined through one or a combination of techniques including but not limited to satellite positioning 501, mobile network location 502, local/short range network location 503, IP network location 504 and/or user input 505.

Satellite positioning 501 can be accomplished using a satellite system such as GPS or GALILEO. Where the device 109 is a mobile device with a mobile transceiver, mobile network location 502 can be used to determine location. Where the device 109 contains a local/short range receiver and the short range transmitter has been geo located, local/short range network location 503 can be used to locate the device 109. The user input sub-system 505 can also take a user entered address and perform a geocode of this address to determine the user's location. The IP network location sub-system 504 can utilise IP address and/or MAC address location databases to determine device location. A user's location can also be obtained via a third party location source 508, for example but not limited to Yahoo's FireEagle service.

The location broker system 506 uses inputs from 501, 502, 503, 504, 505 and/or 508 inputs to best determine the location of the device. It can then output this location as 507 which is represented within the system variables 112. The system variables 112 can then be used by various sub components within 103 as an input to the context manager 1111 therefore influencing relevancy determination.

The location sub-system can also consider a heading input in reference to the heading of the device such that the context manager 1111 understands the direction in which the device is orientated (i.e. North, 15 deg, etc).

Once location 507 is determined, the information used to determine this can be stored within the database/storage component 107 using ontologies from within the ontology repository 1007.

Figure 6:
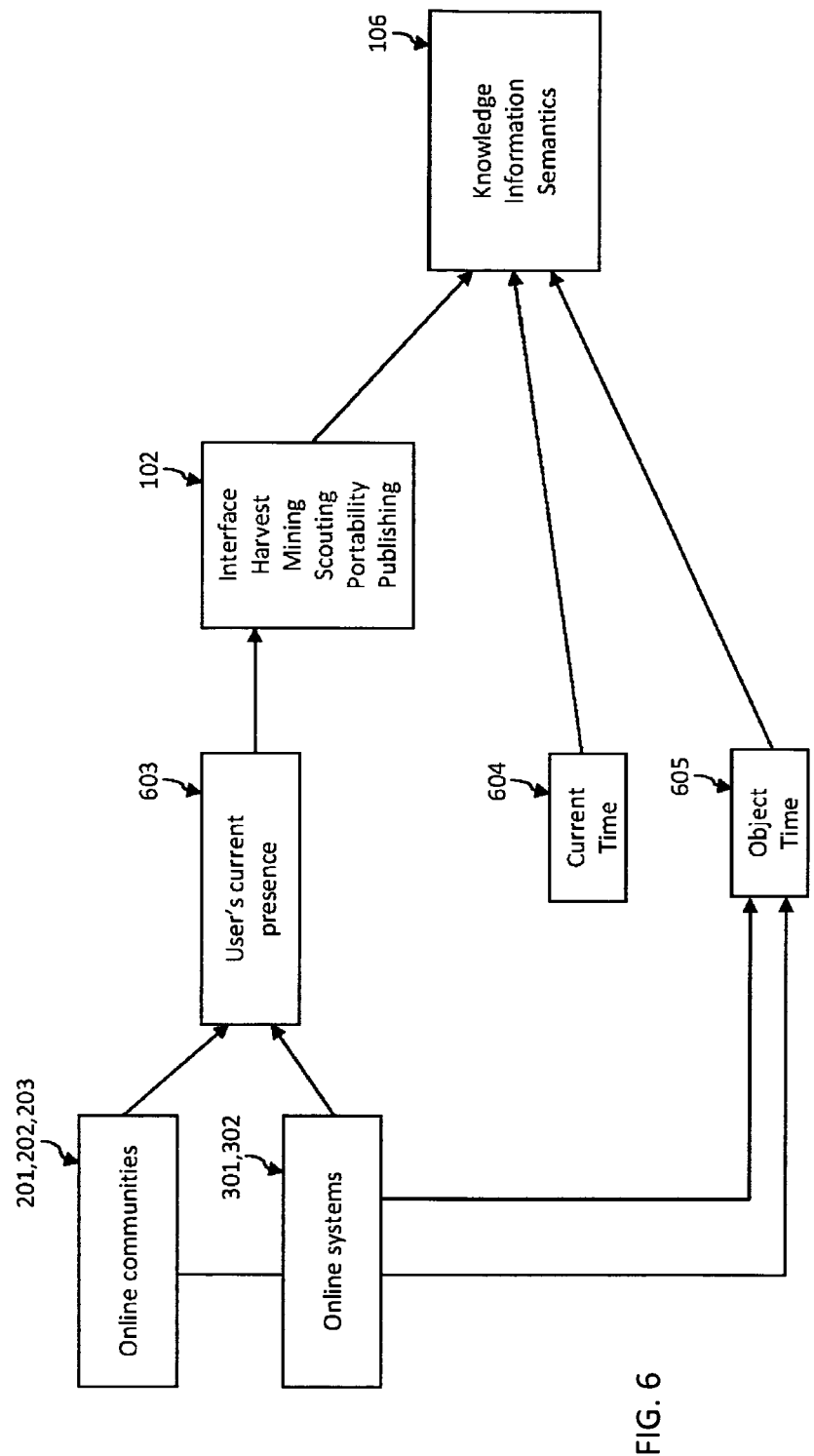
FIG. 6 is a block diagram illustrating various exemplar modules in the presence and time sub-systems, in accordance with certain embodiments.

FIG. 6 is a block diagram illustrating the presence and time sub-system. A user's Online Communities (201, 202, 203, etc) and their Online Systems (301, 302, etc) typically contain multiple presences. Sub-system 603 can extract these presences using system component 102 where this can be mapped into concepts within the knowledge/information semantic layer 106. Furthermore, for actions within the knowledge/information semantic layer 106, the Current Time 604 can be used to time stamp such actions and its resulting semantic metadata to provide a time-stamped semantic representation of the action. In this example, time references are referenced to UTC.

Additionally, information that is indexed and/or extracted from the Online Communities (201, 202, 203, etc) and/or their Online Systems (301, 302, etc) can be time stamped with the time related to the information. This is not typically the Current Time 604, but the Object Time 605 relating to the information where this Object Time 605 can be typically extracted as part of the information itself.

Figure 7:
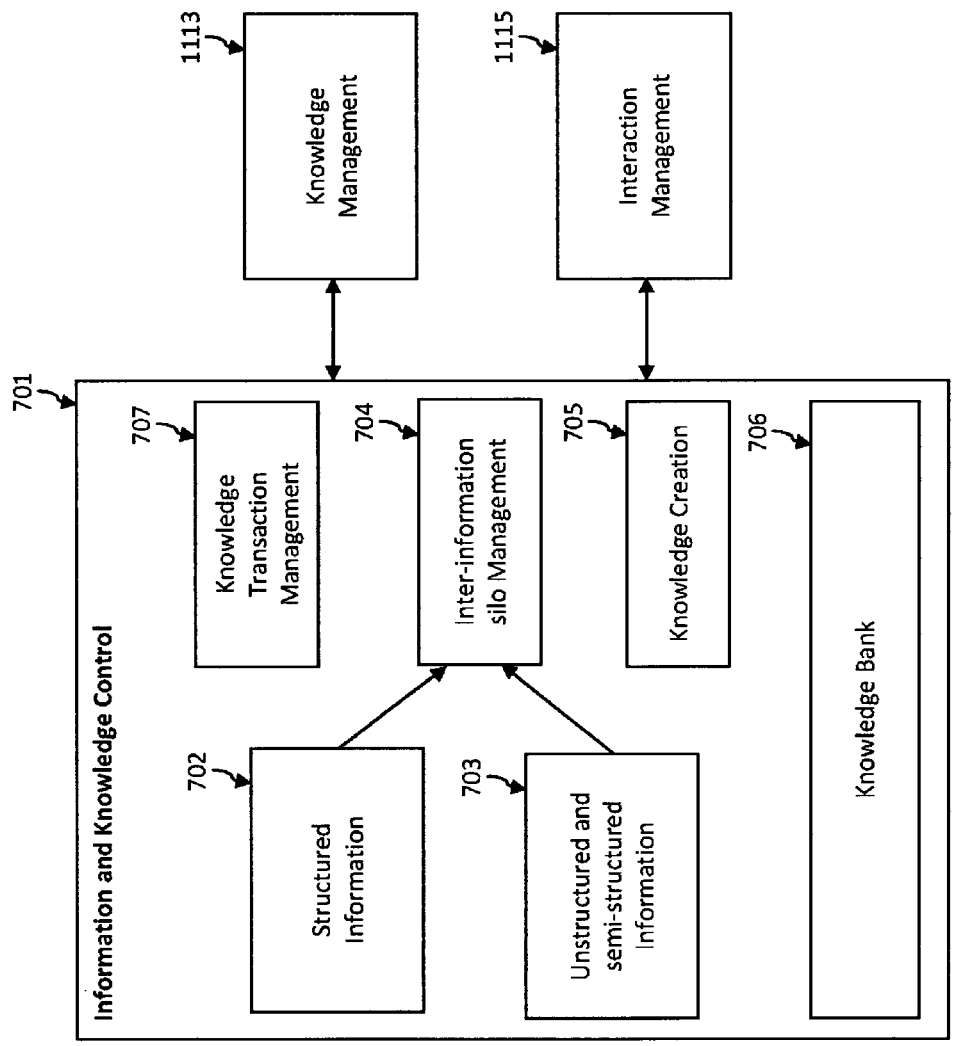
FIG. 7 is a block diagram illustrating different information sources of unstructured, semi-structured and structured information management, in accordance with certain embodiments.

FIG. 7 is a block diagram illustrating the information and knowledge control systems. The Information and Knowledge Control system 701 controls the mapping of structured and/or semi/un-structured information into the system. Where applicable, it is also responsible for inter-information silo management used by the upper layer reasoning system 1109.

Furthermore, it facilitates new knowledge creation and/or the storage of knowledge within the Knowledge Bank 706. Subsequent information and/or knowledge transactions are managed by the Knowledge Transaction Management subsystem 707.

Structured Information 702 and/or Un/semi-structured Information 703 is mapped into the system via the Ontology Mapping function 1002. Information can be harvested into the system, or just indexed. For inter-information silo communications, the Inter-information Silo Management subsystem 704 controls this. Information silos can communicate with each other within the system by agents defined to reason with the various data sources around compatible concept models known to the system and within the Ontology Repository 1007. These agents can be defined within the system based on various products, service and/or knowledge models recognised by the system.

From information within the system, considerable knowledge is generated over time. This knowledge is stored in the Knowledge Bank 706, a virtual layer that indexes and maps the knowledge within the system. Control of the knowledge transactions from within the relevance engine 104 is controlled by the Knowledge Transaction Management subsystem 707. The Knowledge Transaction Management subsystem 707 controls knowledge interactions within the system so that transactional models can be implemented around information and/or knowledge and/or products and/ or services that use this within the MarketPlace 105. As such, each instance of information and/or knowledge and/or product and/or service can have one or more transactional models to control how a user and/or intelligent agent can transact with this instance.

Figure 8:
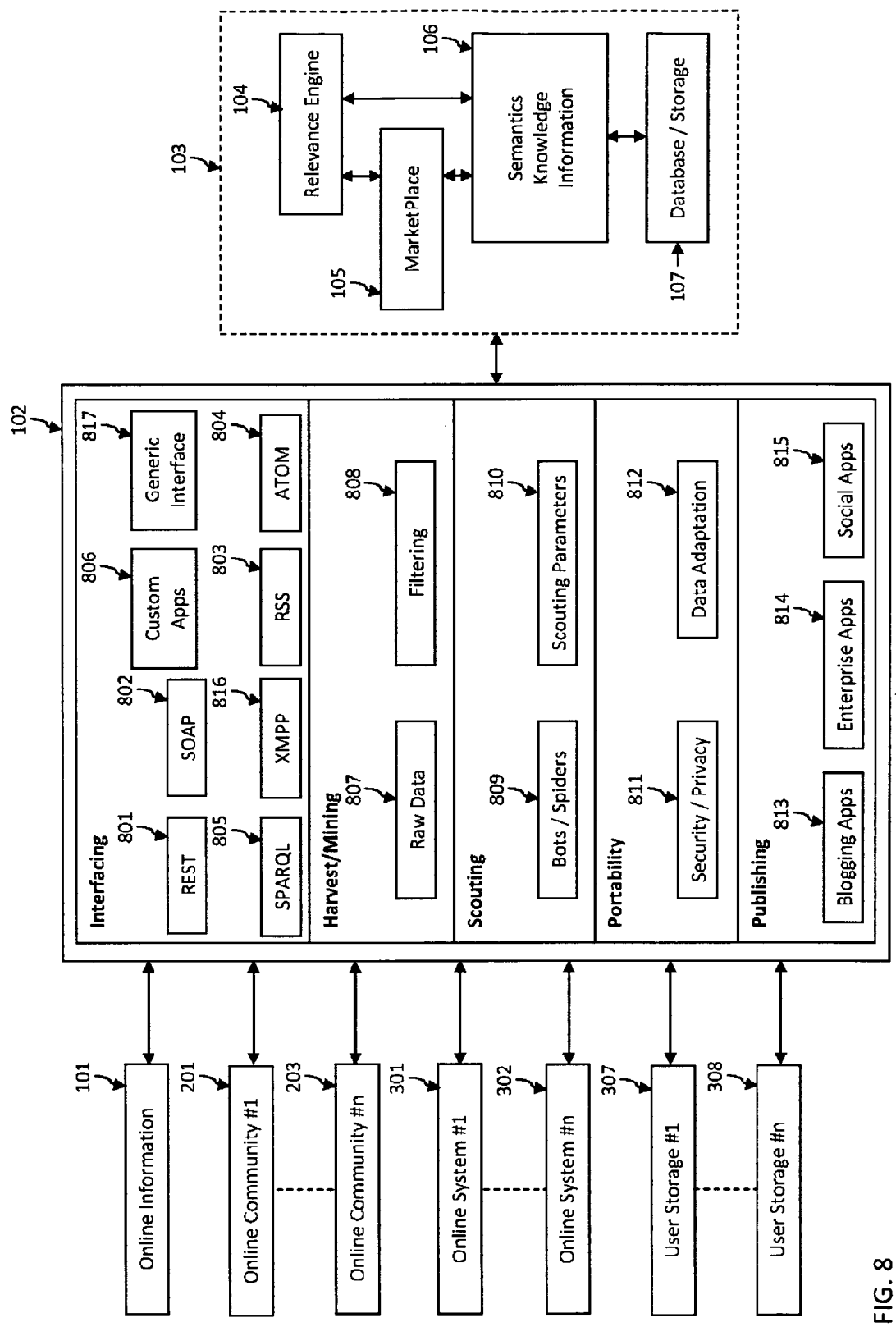
FIG. 8 is a block diagram illustrating the interface, harvesting, mining, scouting, portability and publishing component with its related sub-components, in accordance with certain embodiments.

FIG. 8 is a block diagram showing the various sub components of the interface, harvest/mining, scouting, portability and/or publishing component 102. Component 102 performs the interface tasks to online information, online communities, online systems and/or user storage. In one such embodiment of an exemplary system, interfacing is done through a variety of standardised formats including, but not limited to RESTful 801, SOAP 802, RSS 803, Atom 804, XMPP 816 and/or SPARQL 805. Custom interfacing is supported through custom application 806, an example being the use of Facebook Connect. The Generic Interface 817 allows for future interface protocols and/or specifications to be implemented and supported. Information is passed into the SKI component 106 for further information retrieval, recognition, annotation and/or concept mapping. When a new source of information is identified that does not support access via 801, 802, 803, 804 or 805 a custom solution can be developed and used in 806.

Raw data 807 is collected by the scouting/bot/spider sub-component 809 based on scouting parameters 810 as determined by the system for personalised information retrieval and/or discovery. This raw data 807 can then be pre-filtered and passed to the SKI component 106 for possible further processing. Scouting parameters 810 can be optimised for each user's individual scouts based on the user's various information requirements, context and/or system variables 112.

Data portability functionality is achieved via the data adaptation sub-component 812 which can adapt the data for publishing into external third party data silos. A user's PAP can also be accessed via the System API 113. Privacy and/or access control for these mechanisms is controlled by the portability security/privacy sub-component 811.

A user or an agent can publish, post, or push information and/or data back into third party applications and/or data repositories via the publishing module using but not limited to its sub-components including publishing to blogging applications via 813, enterprise applications/systems via 814 and/or social applications via 815.

A user can import their initial data and subscriptions utilising OPML (outline processor mark-up language) and/or APML (attention profile mark-up language) formats.

Figure 9:
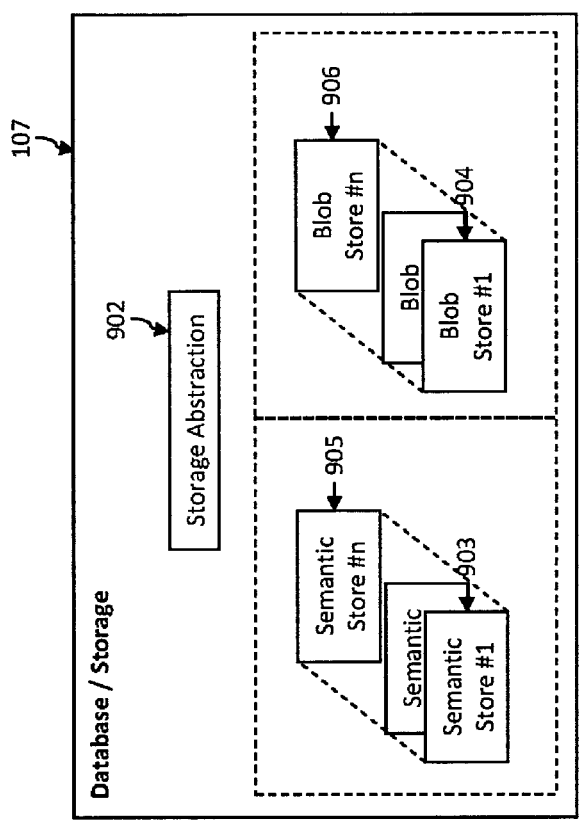
FIG. 9 is a block diagram illustrating the database/storage component of the system framework with its sub-components, in accordance with certain embodiments.

As shown in FIG. 9, the database/storage component 107 comprises of a storage abstraction 902, a semantic store 903 and/or a blob store 904. The physical storage may be various kinds of mechanism for storing computer-readable data, for example magnetic hard disk or optical drives or memory drives.

The semantic store 903 may be federated by interconnecting multiple semantic stores 905. The multiple semantic stores 905 may resolve on individual computers, individual physical storage or on the same computer and the same individual physical storage.

The blob store 904 may be federated by interconnecting multiple blob stores 906. The multiple blob stores 906 may resolve on individual computers, individual physical storage or on the same computer and/or the same individual physical storage.

The storage abstraction 902 manages the interface to the semantic store and/or the blob store hiding the complexity of the federated stores to the semantic component 106 providing a standardised, abstraction interface to the database/storage component 107.

In one embodiment of the implementation, the database/storage component 107 can reside within a cloud computing architecture to assist with addressing installation specific scalability and performance criteria.

Figure 10:
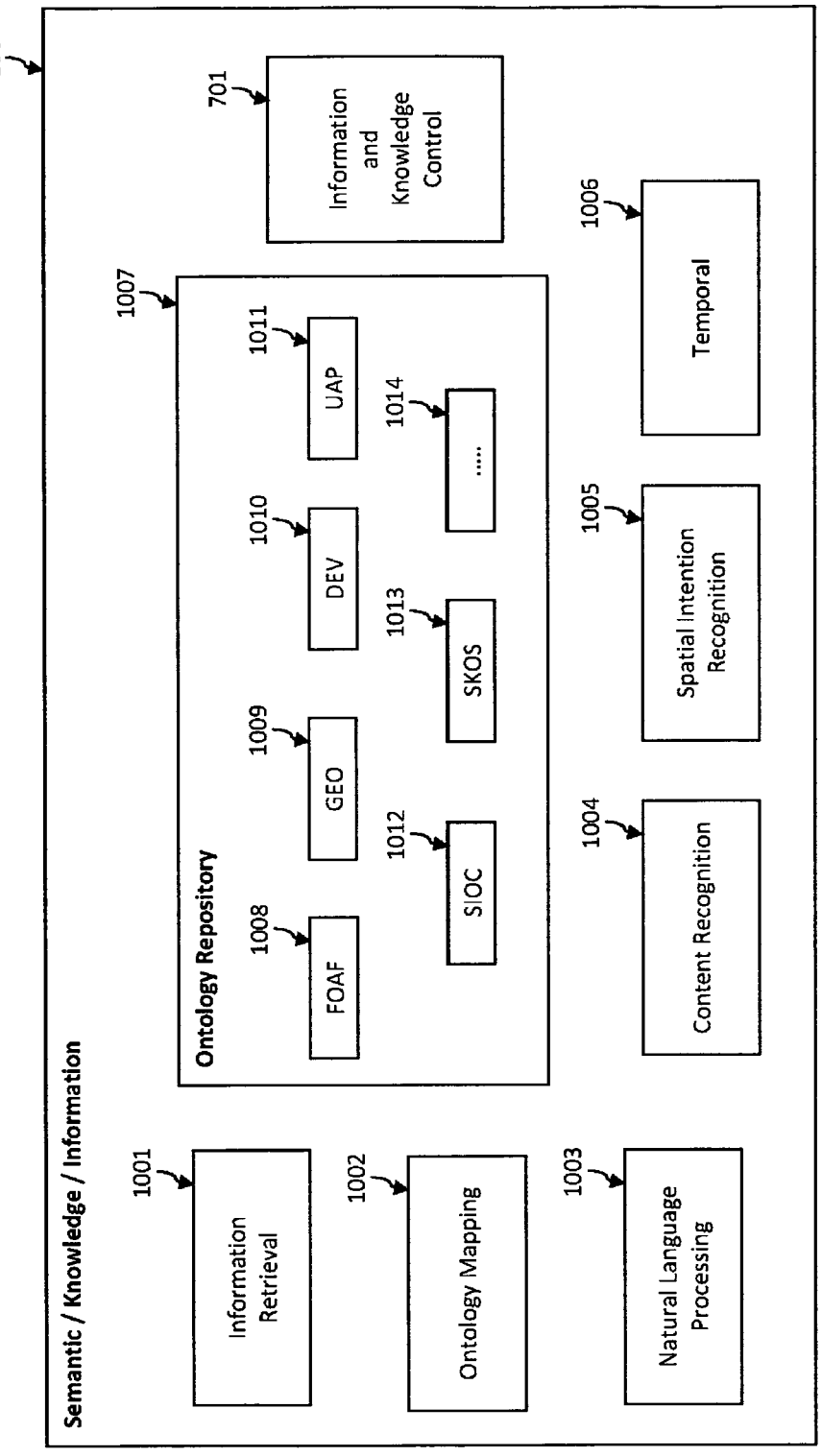
FIG. 10 is a block diagram illustrating the semantic/knowledge/information component of the system framework with its sub-components, in accordance with certain embodiments.

As shown in FIG. 10, the semantic/knowledge/information (SKI) component 106 interfaces to, creates and/or manages information and/or knowledge within the system. The SKI component 106 manages the translation of un-structured and/or semi-structured data into defined concept data within the system. Various sub-system components within the SKI component 106 perform functions including extraction of intra-content metadata, content knowledge determination through natural language processing, content recognition, spatial intention recognition and/or temporal bounding.

The SKI component 106 interfaces to the database/storage component 107 to store, retrieve, delete and/or query stored data and/or blobs within the system.

The SKI component 106 interfaces to the relevance engine 104 to provide structured data for analysis and/or inferencing to determine relevance.

The information retrieval component 1001 takes un-structured and/or semi-structured data sources, conditions this data and passes this conditioned data to the ontology mapping component 1002 for system concept mapping. Prior to the importation of new un-structured or semi-structured data, the information retrieval component 1001 is typically adapted to recognise these new data sources and/or how this information is to be conditioned. Part of the information retrieval component 1001 is the function of intelligent agents. An intelligent agent traverses third party information data silos in search of information and/or knowledge that is considered relevant common knowledge for the system or considered highly relevant to an individual system user. An example of this function of an intelligent agent is a Twitter intelligent agent that interfaces to Twitter to extract conversational information and/or knowledge for processing by the SKI component 106. Another such example could be a Google Wave intelligent agent.

As part of the information retrieval process, the information retrieval component 1001 could encounter a link (this can be for example in the form of a URL/URI, a contact link, or any link to additional objects) to addition information. The information retrieval component 1001 can harvest this additional information and process this accordingly. The linkages can be mapped within the semantic layer so that this can be used when determining PAR for a particular object (i.e. not only the object's information, but its links and the information linked to and so forth is considered when determine PAR of objects. An example of this could be when a URL link may be within a particular object, for example a Tweet). Within the system, the information retrieval component 1001 can further retrieve information contained within the link (and any subsequent links found within the content of this link, and the content represented by the links found, and so on to a system configurable link depth) by processing these links and their content concepts to determine the relevance (PAR) of the original object.

The ontology mapping component 1002 is programmed to understand concepts and/or solutions to map known un-structured and/or semi-structured data into pre defined system ontologies that are configured within the ontology repository 1007. The ontology mapping component 1002 semantically processes and/or analyses the data through pre-programmed concepts and/or solution mapping. Mapping is extensible such that new system ontologies can be defined. Once mapping is configured, the system can reason and inference with this data in the relevance engine 104 for relevancy determination.

Prior to proceeding with unstructured data harvesting, the SKI component 106 may be adapted so that conditioned data from the information retrieval component 1001 can be mapped into system ontologies represented within the ontology repository 1007. This adaption process is performed upon the requirement to harvest/retrieve information from a new data source. Each harvest/retrieve process is typically dependent on the data being harvested and the interface to this data's repository. The interface/harvest process is managed by the system component 102.

The ontology repository component 1007 contains representations of ontologies known to the system. New ontologies can be added to the ontology repository 1007 and then from within the ontology mapping component 1002, components of these ontologies including but not limited to classes, attributes, relations, function terms, restrictions, rules, axioms and/or events can be cross referenced to other such components within known ontologies to create relationships within the system. The Web Ontology Language OWL is typically used to provide cross referencing.

Depending on the nature of the ontology, the ontology repository 1007 can either store the entire ontology or can reference an external representation of the ontology by maintaining a link to the external representation of the ontology.

The generation and/or maintenance of structures for the various information elements takes into account the dynamic changes within the overall system information to regularly (re)compute PAR for each object. The system uses ontologies to provide a unified machine-interpretable domain vocabulary. This allows for a semantic-based integration of diverse context sources through linking parameter types of the meta-model to the system context ontologies stored within the ontology repository 1007. An example of a linking parameter types is the OWL:sameas property.

The system context ontologies define the basic contextual categories and the relations among them. This common high-level structuring of context information enables its integration and/or consolidation on a semantic level. Furthermore, the axiomatic descriptions of context elements such as personal situations (@home, @work, etc.) are used by the context management sub-system 1111 within the relevance engine 104 to allow context reasoning.

The ontologies within the system can be described using OWL, the Web Ontology Language. The system can also utilise PR-OWL (probability OWL) which can be used within the semantic linked Bayesian networks sub-component 1105 to determine relevance.

The system's context ontologies can consist of (but not limited to) several modules describing general vocabulary concepts on temporal, spatial, social connect (FOAF), personal information, socially interconnected communities (SIOC), user attention profile, services (OWL-S), knowledge mapping (SKOS), device (DEV).

The Friend of a Friend or FOAF ontology 1008 is a machine-readable ontology describing persons, their activities and their relations to other people and objects. FOAF is a descriptive vocabulary expressed using RDF Resource Description Framework and OWL Web Ontology Language.

The system can utilise many key terms and properties within FOAF ontology 1008 including:

knows: indicates a person known by this user (i.e. can be another FOAF instance by also using rdfs:seeAlso or just simply a person's details). The system uses this term to build out a decentralised view of the social graph for use within the social network analysis sub-system 1107.

onlineAccounts: indicates the details for the user's online accounts. This is used to determine which online information stores to interface to via 102 and is also used to implement the social wallet method via System API 113.

agent: FOAF is also used to describe intelligent agents or personalised scouts within the system as depicted by 809 and 810. These agents can be associated with people, groups and/or organisations and can themselves have accounts within other platforms. For example, a user can have a Twitter intelligent agent that is used to harvest relevant information from Twitter via its API.

group: groups are used to describe groups within the system that are then utilised by the collaborative management sub-system 1110 to determine relevant collaborative actions and interactions.

interests: describes particular interests of a user. The system utilises this information for interaction with UAP ontology 1011 to map a user's attention profile.

Information stored within the database/storage sub-system 107 can be geospatially tagged. This tagging can then be used as an input to the Context Management sub-system 1111. In its rawest form, each piece of information can be tagged with a WGS84 position, for example:

```
<wgs84_pos:alt>900</wgs84_pos:alt>
<wgs84_pos:lat>44.5667</wgs84_pos:lat>
<wgs84_pos:long>6.5000</wgs84_pos:long>
```

As semantic data is stored within the semantic store 903 or federated semantic store 905, the usage of interconnections between ontologies can be utilised such that rather than semantic data referring to absolute location (as given by the example above), the system can utilise relations between the ontologies to create relative location references between instances of ontologies. For example, rather than pin pointing a user at a latitude/longitude as the above example does, the system could (assuming cross ontology support) pin point the user at an ontology instance that, for example, represents an object within the system. This object, for example, could be the place of work of the user. This can improve spatial query performance when used within the context management sub-system 1111 within the relevance engine 104. A further example of this is support for the Geonames ontology as a subset of the systems spatial ontology. By utilising this ontology the system can place objects at predetermined locations and therefore perform additional reasoning around this to determine relevance. An example of the Geonames ontology is depicted in FIG. 12.

Spatial information can also be dimensioned by time via 604 and 605 giving temporal reasoning capability to the system. This information can be used by the spatial intention recognition sub-system 1005 to statistically reason object location intention.

Semantically-Interlinked Online Communities (SIOC) ontology 1012 provides methods for interconnecting discussion methods such as blogs, micro-blogs, forums and mailing lists to each other. It is an open-standard machine readable format for expressing the information contained both explicitly and implicitly in Internet discussion methods. In this embodiment, SIOC represents the core ontology to support the conversation management sub-system 1114 and the collaborative management sub-system 1110.

The SIOC vocabulary is based on RDF and is defined using RDFS. The system can utilise certain terms within SIOC ontology 1012 including, but not limited to:

community: this term describes the group of users and intelligent agents that are interested in a particular piece of information. This is used by 1103 within the relevance system for relevance determination.

container: this term allows SIOC instances to have containers such that a group of SIOC instances are interconnected via this. This is used by 1103 within the relevance system for relevance determination.

forum: this term captures conversations around information within particular containers item: an item is something (i.e. an object) that resides within a container. For example, within the collaboration management sub-system 1110, this might refer to a particular document or might be a picture in reference to a particular social media interest group post: this term is a post that is sent to a particular forum, for example it might relate to conversation around a particular item within a container. This is used by the conversion management sub-system 1114.

role: this term describes the function of a particular user. This is used within the social network analysis sub-system 1107 and the privacy management sub-system 1112.

site: this term describes a location of an online community or set of communities, with users creating items in a set of containers.

space: this term defines a place where data resides. It can be the location for a set of containers of content items, e.g., on a Site, personal desktop, shared filespace, etc.

user: this term defines an online account of a member of an online community. It is connected to items and posts that a user creates or edits, to containers and forums that it is subscribed to or moderates and to sites that it administers. An example of an instance of SIOC is depicted in FIG. 13.

SIOC facilitates a decentralised architecture such that conversations can be carried out over multiple channels and communities both internal and external (within 101) to the system. External systems are connected into the system via 102.

The User Attention Profile (UAP) ontology 1011 is and RDF/OWL or RDFa/OWL version of the Attention Profiling Mark-up Language (APML). An example of AMPL in its current form is depicted in FIG. 14.

UAP instances are stored in the database/storage semantic stores 903/905. These instances can be used by the relevance engine 104 to determine relevance based on the user's current contextual state. The contextual states within UAP provide contextual dimensions to a user's personalised attention profile (PAP).

UAP ontology 1011 provides a mechanism to integrate trust into the system. The trust of a particular topic of knowledge or information or trust of a particular user by another can be described through interconnections of UAP, SIOC and FOAF. UAP can also be used to contextual dimension services and/or applications offered within the marketplace 105.

The capabilities of different devices 109 used within the system may be expressed using an ontology with device specific instances. Because the system understanding the device ontology instance for each device 109, when the user accesses the system from a known device, the Personalised Relevancy Interface 108 can provide relevant, device specific services. This can also enable the system to model the user interaction with the device within the behavioural modelling sub-system 1102 and therefore further adaptively adjust the user interface to be personalised and relevant to the user. Also because the system can implicitly understands the user's device capabilities, user-to-user interaction can be adapted so that interactions can take place knowing the device platforms that the interactions are occurring from.

The DEV ontology 1010 describes a device connected to the system, enabling behavioural usage patterns to be analysed within the behavioural modelling system 1102. DEV instances provide data to the marketplace sub-system 105 so that relevant services and/or applications can be offered to the user based on their device usage habits/patterns.

Simple Knowledge Organisation System (SKOS) ontology 1013 provides a model for expressing the basic structure and content of concept schemes such as classification schemes, subject heading lists, taxonomies, folksonomies, and/or other types of controlled vocabulary. As an application of the RDF, SKOS allows concepts to be documented, linked and/or merged with other data, while still being composed, integrated and/or published internal and/or external to the system (via 102/101).

The system can employ two kinds of SKOS ontology 1013 implementation, 1) basic SKOS whereby conceptual resources (concepts) can be identified using URIs, labelled with strings in one or more natural languages, documented with various types of notes, semantically related to each other in informal hierarchies and association networks, and/or aggregated into distinct concept schemes (i.e. contextual ontologies) and 2) advanced SKOS whereby conceptual resources can be mapped to conceptual resources in other schemes and grouped into labelled or ordered collections. Concept labels can also be related to each other.

SKOS can be used within any sub-systems 1103 of the relevance engine 104. Examples of how SKOS is used within the system are:

1) defining a knowledge concept around the keyword (tag/annotation) "football". Note that the preferred label also represents the preferred language (in this case 'en').

```
ex1:football rdf:type skos:Concept;
    skos:prefLabel "football"@en.
<http://en.wikipedia.org/wiki/Football>
    rdf:type foaf:Document;
    dc:subject ex1: football.
```

2) capturing knowledge around changes within knowledge, for example within workspaces of the social collaboration concept

```
ex:ontology skos:changeNote [
    rdf:value "Added new contextual ontologies to document"@en;
    dc:creator ex: SimonButton;
    dc:date "2009-01-02"].
ex:SimonButton rdf:type foaf:Person; foaf:name "Simon Button".
```

3) Defining a preferred label so that the system and/or third party applications can determine the preferred form to display the name of the person represented. Note again the preferred language field.

```
<http://www.ozmota.com/people/Button/card#i>
    rdf:type foaf:Person;
    foaf:name "Simon James Button";
```

-continued

```
rdfs:label "Simon Button";
skos:prefLabel "Simon Button"@en.
```

Services and applications within the system that a user can use and interact with are represented by the OWL-S and OWL-SF semantic services framework facilitating service description, discovery and negotiation.

Services and/or applications such as rating, conversing, collaboration, sharing, interaction and the like can be integrated within the system. Additionally, services and/or applications may be defined by third party vendors form another category of services within the system. These services and/or applications offer functionalities and behaviours that can be described, advertised, discovered, and/or composed by others. Because these services and/or applications are based around defined ontologies, they can interoperate even though they have not been designed explicitly to work together. This interoperability of services is based on the system's ability to understand other services and/or applications and reason about their functionalities and behaviours when necessary.

The services sub-system is capable of automatic service discovery where intelligent agents/scouts within 102 are used to discover web services that fulfil a specific need within some quality constraints, and typically without the need for user intervention. The services sub-system also supports automatic web service invocation whereby an intelligent agent/scout within 102 can automatically read the description of the Web Service's inputs and/or outputs and invoke the service accordingly. The services sub-system also supports automatic web service composition and interoperation where the system can perform service tasks involving the coordinated invocation of various supported web services, based solely on the high-level description of the objective.

The OWL-S ontology used by the system has three main parts: the service profile, the process model and the grounding.

The service profile is used to describe what the service does. This information is primarily meant for human reading, and includes the service name and description, limitations on applicability and quality of service, publisher and/or contact information. The service profile is used to represent, to the user, the service benefits.

The process model describes how a user can interact with the service. This description includes the sets of inputs, outputs, pre-conditions and/or results of the service execution.

The service grounding specifies the details that a user needs to interact with the service, such as communication protocols, message formats, port numbers, etc. This information is hidden from the end user and resides within the semantic metadata.

Other aspects of the services framework can include 1) contracting and/or negotiation with ontology-based services, 2) invocation, adaptive execution, monitoring, and/or management of services, 3) ontology-based security and/or privacy issues in services in conjunction with the privacy management sub-system 1112, 4) reasoning with services in conjunction with the reasoning/inferencing sub-system 1109, 5) ontology-based policy management for services.

Natural Language Processing (NLP) sub-system 1003 linguistically analyses text within harvested content, conversations within the system, and user contextual search requests in order to perform named entity recognition and/or term classification. Such text analysis can also determine content summarisation, topic recognition, noun/phrase extraction, or combinations thereof. In addition, predetermined dimensional analysis of the text can determine the tone of the text, the demographic or target audience of the text, the interest of the target audience within the text, the language of the text, or combinations thereof.

The NLP sub-system 1003 identifies concepts of interest and establishes relationships among resources that can be subsequently used by the relevance engine 104. This allows the system to understand the meaning of harvested textual content. Also, the system can understand the user's intention within conversation and/or contextual interactions controlled by 1114 and 1115.

The NLP sub-system 1003 maps its outputs into contextual ontologies within the system that have been created to define concepts of content, conversations and/or services.

A further aspect of the conversation management sub-system 1114 is that advanced types of services can be offered through the use of trained conversational agents. The conversational agent can understand the user's intention through conversation and accordingly help execute an appropriate action, service and/or interaction within the system.

The NLP sub-system creates semantic metadata for the analysed content in almost real-time finding concepts within this content. This metadata can then used within the relevance engine 104 to perform logic-based reasoning to infer new, implicit knowledge based on what has been already asserted in an explicit manner.

Within the content recognition sub-system 1004, the system can analyse any form of social media and/or content to derive semantic metadata describing the content. This semantic metadata can be derived from semi-structured content or by performing processing on the content itself to infer semantic metadata about the content and/or its composition. For example, the system can extract semantic metadata from content related to image/video characteristics as well as analyse the image/video and determine for example the subject of the image or the presence of a person within an image/video.

Within the spatial recognition sub-system 1005, a forward prediction of the spatial trajectory of the user's device can be determined which can then used by the relevance engine 104 and/or the marketplace 105 to provide real-time localised relevance via the Personalised Relevancy Interface 108. Spatial recognition allows users accessing the system via a device 109 to interact with the Personalised Relevancy Interface 108 based on their current location. Two types of spatial intention recognition can be employed, 1) short term interpretation whereby the previous spatial path/trajectory is analysed to determine statistically the most probable short term spatial trajectory of the user and/or 2) the user's history and system trends are also considered in the analysis.

Data within the system can be time-stamped by the temporal sub-system 1006 so that temporal recognition and/or temporal analysis can be applied within the relevance engine 104. Temporal information can be used by the context management sub-system 1111 to determine current contextual state requirements.

The information and knowledge control sub-system 701 resides within the SKI component 106. From within 701, the knowledge creation sub-system 705 can automatically generate new knowledge through algorithms that assess users' PPPs, the supported system ontologies and/or concepts, and/or contextual variables within the system. This allows the relevance engine 104 to subsequently present and interact with this new knowledge within relevant containers bound by contextual states as controlled by a user's PAP. This presentation can further be controlled via the MarketPlace 105 in conjunction with the knowledge transaction management sub-system 707 such that the system can determine the value of the new created knowledge and the contribution from individual user's based on their PPP. Furthermore, the system can determine if knowledge, products and/or services made available from within the MarketPlace 105 was utilised for new knowledge creation, what then determine what attribution (if any) is required back to the owner of such knowledge, product and/or service.

Figure 11:
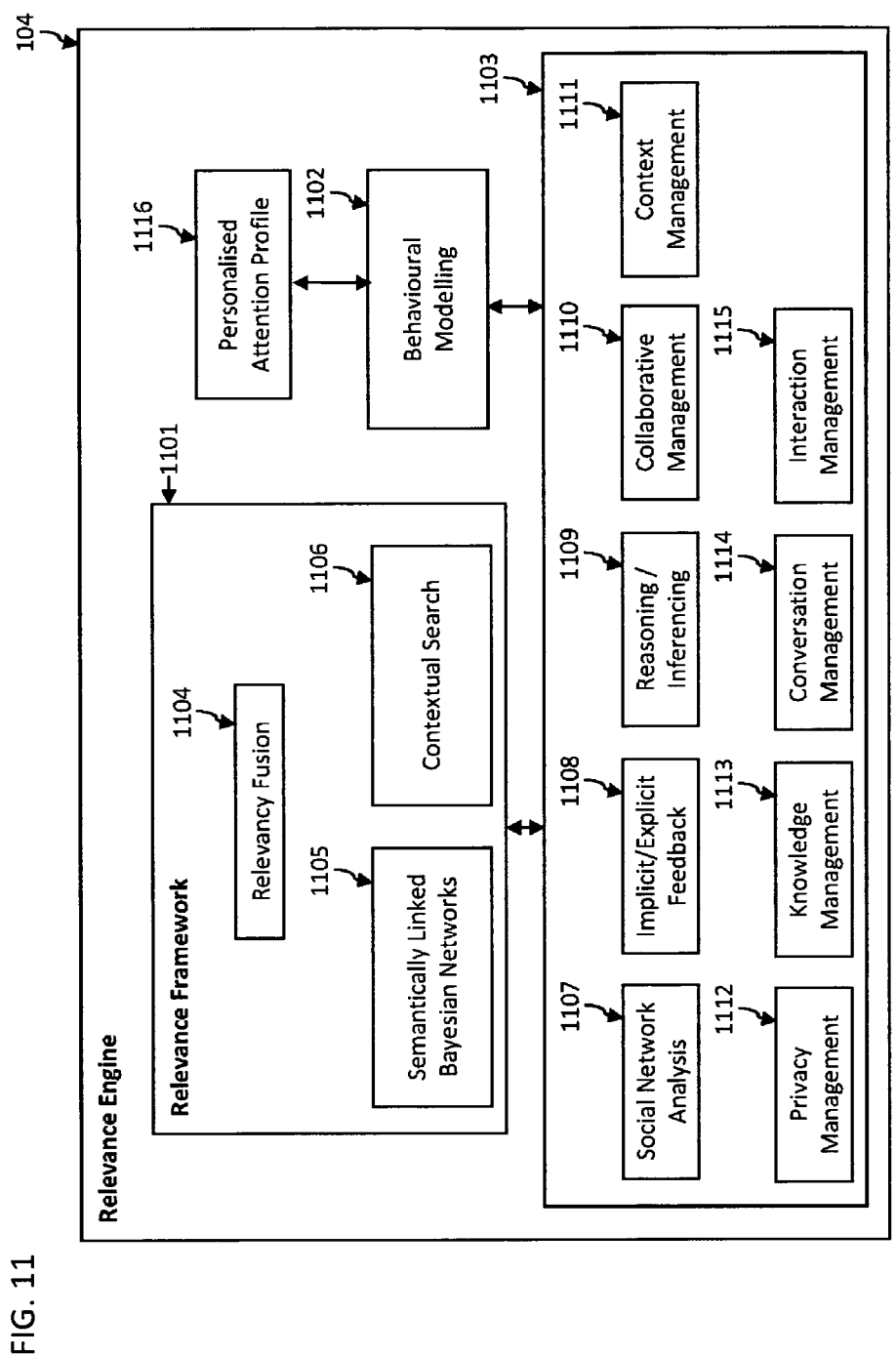
FIG. 11 is a block diagram illustrating the relevancy component of the system framework with its sub-components, in accordance with certain embodiments.

As shown in FIG. 11 the relevance engine 104 is made up of several sub-system components that perform tasks to determine contextual relevance for a user, whether it be around other users, objects, information, knowledge and/or media. The relevance framework 1101 determines a user's personalised attention profile (PAP) 1116 using machine learning semantic Bayesian networks and subsequently ranks individuals' objects giving these objects a personalised attention ranking (PAR) derived for an individual user's PAP 1116. Because each user's PAP is different and changes with context, it is possible (and likely) that the same object within the system has a different PAR for each individual user. Furthermore, an object's PAR will change as the context of the user changes.

The relevance engine 104 contains sub-systems including semantically linked Bayesian networks 1105, relevancy fusion 1104, contextual search 1106, social network analysis 1107, implicit/explicit feedback 1108, reasoning/inferencing 1109, collaborative management 1110, context management 1111, privacy management 1112, knowledge management 1113, conversation management 1114 and/or interaction management 1115.

The relevance engine 104 managers a user's attention profile via a user's PAP 1116 such that changes in the way a user interacts with objects within the system influence the user's attention profile based around contextual states. This in turn influence object PARs and therefore what is relevant to the user. Interactions within the system (collaboration, sharing, discovery, service usage, and/or conversation) may influence the real time PAP 1116 of the user.

Contextual states within the system allow the user to cluster knowledge, information, interactions, conversations and/or people interests within these predefined and/or user definable states. The context management 1111 sub-system manages the change between user contextual states either manually (user selected) and/or automatically. Automated contextual state changes can occur because of various sensory inputs to the system (such as location—i.e. in the office) as well as relevance driven switching whereby important information, knowledge, interaction and/or conversation can interrupt a particular contextual state and force or recommend a change of contextual state. For example, the user could be in a contextual state called "home", when a piece of information is added to this user's work social collaboration workspace and as such the relevance engine 104 and the context management sub-system 1111 can determine that a recommended temporary change from the contextual state of "home" to the contextual state of "work".

The context management sub-system 1111 can have containers within it that allow groupings of particular information, knowledge, services, and/or interactions within it that can be controlled by the MarketPlace 105. These containers can be free, premium or enterprise containers that can be branded by marketeers and/or controlled by enterprises around project and/or innovation concepts. The platform driving the containers can be offered as, but not limited to a Software as a Service (SaaS), or a Platform as a Service (PaaS). Such configurations could be installed behind an organisation's firewall.

The social management sub-system 1107 provides relevancy ranking parameters including trusted source management, various forms of centricity analysis, and/or management of reasoning between two or more PAP's within the system from a social contextual perspective. Connection to the social graph is managed by the SKI sub-system 106 and 102 for interconnection to third party data that forms part of the social graph.

Several techniques may be used to analyse a user's social relationship so that this relationship may then be used to determine a user's PAP 1116. Prior to this analysis, the social graph may be contextually adjusted based around current context state of the user of interest. This adjustment is performed so as to determine social context and/or trust within particular context states as this may have an impact on determining relevancy. For example, a user's social connection between friends that are also work colleagues needs to be considered when looking for centricity given that the current context state impacts relevancy.

Methods used within the social management sub-system 1107 include (but are not limited to) 1) user degree centricity where the user with the most connections within a particular part of a group is determined (probably quite active in the group), 2) user closeness centricity where the user with the shortest paths to anyone else within a group is determined (probably the group leader), 3) user between centricity where the user that is more often on the shortest path between other actors within a group is determined (the person that can control flow between people in a group).

By determining these forms of centricity the social management sub-system 1107 can determine potential influencers within a particular part of the social graph which therefore influences relevancy. For example, when socially collaborating within the system, trusted sources of collaboration for a particular concept or topic can be determined. By determining the degree of centrality between users' PAPs 1116 and then using weighted semantically-linked Bayesian networks, relevancy of a particular concept or topic is determined. Therefore, should a trusted user recommend a piece of information for collaboration, this analysis may determine if this information is of high relevance to a particular user 110.

The knowledge management sub-system 1113, PAR identifies appropriate and trusted sources of recommendations using the knowledge related to these sources (can be people or objects) (i.e. their PAP) and then uses this information to assist in relevance seeking for an individual. This approach to knowledge management is oriented around first identifying the appropriate and trusted sources of information and then using the knowledge held by these individuals or objects to assist in the information seeking task of the user. Knowledge within the system can take many forms including information, conversations, services, interactions and/or applications.

The implicit/explicit feedback sub-system 1108 uses non-personal information from within the semantically linked Bayesian networks 1105 to pre-seed a new user's profile to overcome cold start issues within the system. Such examples of implicit feedback include common device utilisation knowledge (i.e. this user is another iPhone user), location, time and/or content usage habits of socially connected users already known by the system. Explicit feedback commences after the user starts to use the system and is based around aspects that are deemed contextually relevant by the relevance engine 104 (temporal, social, location, device, attention profile, etc.). The system can implement a goal based user profile building methodology where as the user follows this by inputting more information about themselves, the discovery of relevant information becomes more prevalent.

Traditional Bayesian networks (BNs) are one form of uncertainty inference framework used. However when an uncertainty problem (i.e. determining contextual relevance) is distributed across multiple domains of knowledge, a single BN cannot be created. Attempting to integrate separate BNs describing each domain is difficult as inter-domain parameters must be interconnected. Furthermore, such inter-domain interconnections cannot be 'auto wired' based on properties of ontologies describing such domains (i.e. through OWL:sameas for example). To overcome this difficulty and provide inferencing across domains of knowledge to provide contextual relevance over a multi-domain knowledge base, the system employs the use of Semantically-Linked Bayesian Networks (SLBN) 1105. SLBN 1105 define linkages between semantically similar variables and probabilistic influences are carried by cross-linkages from one BN to another by soft evidences and/or virtual evidences predominately modelled by the SKOS ontology 1013. SLBN sub-system 1105 resides within the relevance framework 1101. SLBN 1105 are well suited to calculating a user's PAP 1116 to determine relevance and model the user's behaviour because of the well defined ontologies known to the system within the ontology repository 1007 and the well defined linkages between these ontologies predominately modelled by the SKOS ontology 1013.

The behavioural modelling 1102 sub-system performs multiple tasks to determine a user's contextually bound PAP 1116. The behavioural modelling 1102 sub-system analyses user interactions within the system as a user collaborates, shares, discovers, searches and/or generally interacts with objects within the system. This form of explicit feedback allows the behavioural modelling 1102 sub-system to store this usage within the semantic metadata which can then be used for future relevance determination within the system. Aspects of this usage include click streaming, user interaction streaming, collaboration streaming and/or conversation streaming. The associated semantic metadata is in effect a breadcrumb (i.e. a historical representation of a user's path through the semantic metadata recorded by links within this metadata for future relevance determination under similar identifiable conditions).

Another part of the behavioural modelling 1102 subsystem is its approach to the of creation of user profiles such that this modelling anticipates a user's profile with minimal user participation thereby initially implicitly generating a user's personalised attention profile 1116. This can minimise the upfront time investment required by the user to gain benefit from system usage. This can increase the likelihood that the user will see benefit in using the system with minimal system setup.

The system exploits socially connected user PAPs 1116 to determine PAP unions as a proxy measure of the likely relevance over particular aspects of the individual's respective PAP 1116. A user's individual PAP 116 changes with changes to contextual states as determined by context management 1111. The system stores a user's PAP 1116 in semantic metadata with every change in PAP 1116 storing a historical record of a user's PAP 1116. This metadata provides future information for determining relevance as two closely related instances of PAP 1116, either two instances of an individual user or user-to-user indicates the likelihood of perceived relevance related to these PAP 1116 instances (i.e. the greater the similarity between two PAPs 1116, the greater the likelihood that this indicates objects of relevance).

The behavioural modelling 1102 sub-system, in conjunction with the knowledge management sub-system 1113, allows the user to provide explicit feedback on information sources. This can provide additional information to the system in situations where additional knowledge about the appropriateness of sources is available to the user but not the system, or where the user wishes to be more selective about the choice of information source. It also provides a form of 'safety valve' in case of any discrepancies in how the system and the user perceive the trustworthiness of a source. When a user provides such feedback, this is stored within the semantic metadata of system for future reference when similar reasoning is being performed with the reasoning/inferencing 1109 sub-system.

The privacy management 1112 sub-system restricts semantic metadata from a particular user based on the system policies and user settings. Such restricted metadata is not used within this user's PAP 1116 and not used within the relevance engine 104 in general for this user. The user can configure various levels of service that require different levels of private semantic data sharing. This is controlled by the privacy management sub-system 1112. Access control of information available via the System API 113 is determined by the privacy management sub-system 1112. One example of access control employed within this API is FOAF+SSL management.

The contextual search 1106 sub-system uses a user's PAP 1116 to personalise a user's search query and to better order and/or filter the search results to rank search results in order of relevancy. An example of personalisation of a user's search query is where a location keyword is added to the search query. The contextual search 1106 sub-system allows searches to be conducted within the systems semantic metadata as well as external online information sources 101. The search results are augmented and/or adapted based on a user's current PAP 1116.

The relevancy fusion 1104 sub-system fuses relevant objects from within the semantic metadata to the necessary personalised relevancy interface mapping required for the device a user is currently using based on the DEV ontology 1010. These relevant objects including knowledge, information, conversations and/or services. The fusion of objects to the personalised relevancy interface will take each individual object's predetermined characteristics into account with this being determined by a user's PAP 1116. Various forms of clustering techniques are used to optimise the Personalised Relevancy Interface 108.

Figure 15:
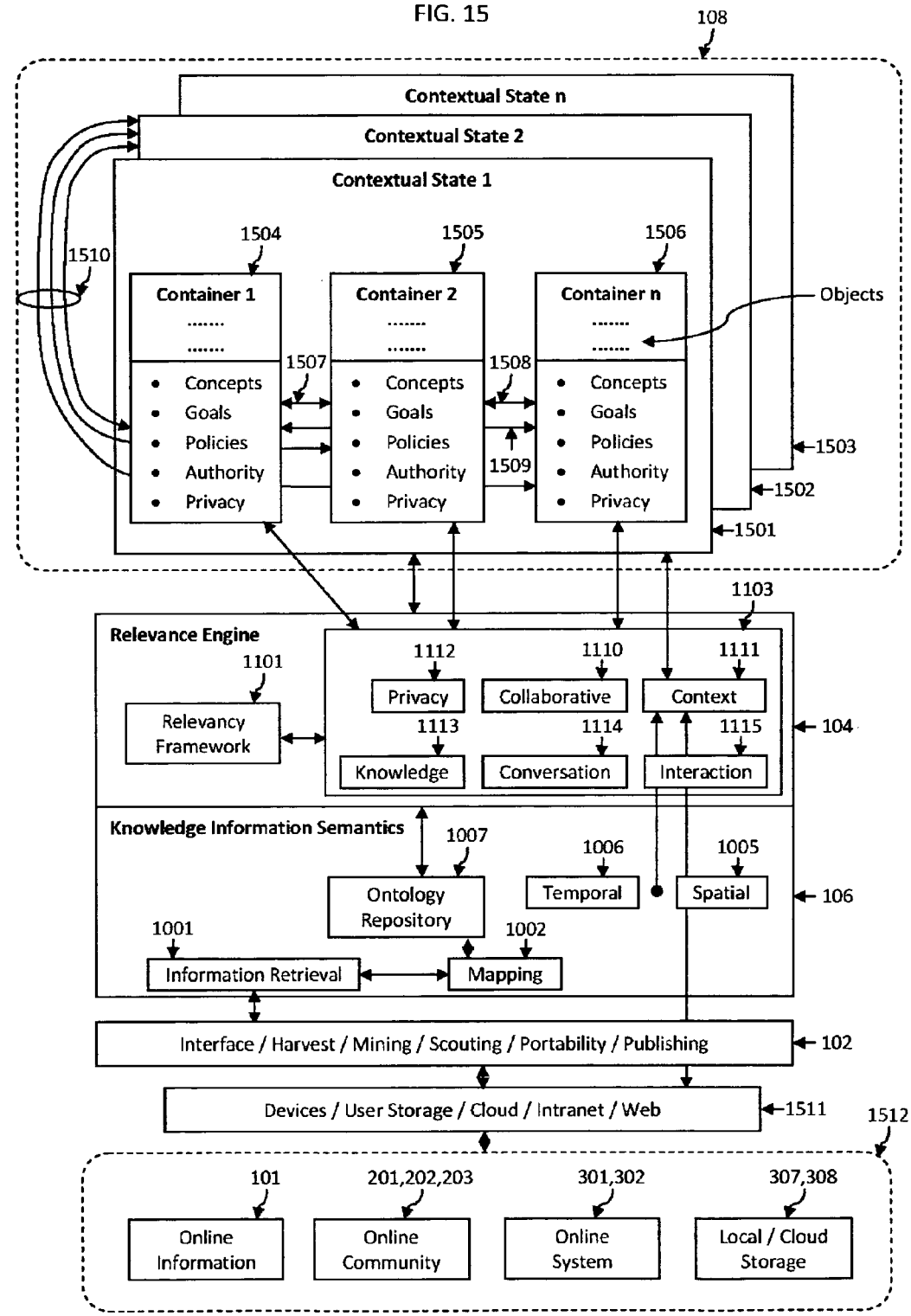
FIG. 15 is a block diagram showing the high level system overview with containers and contextual states, in accordance with certain embodiments.

The relationship between containers and contextual states and the underlying system is shown in FIG. 15. Contextual states 1501, 1502 and 1503 represent the states that embody the containers within the system. Contextual states are managed by the context management sub-system 1111. Each container within the system 1504, 1505 and 1506 have a particular set of concepts, goals, policies, authorities and/or privacy methods associated with it that defines ownership of the container, privacy, sharing and/or collaboration within a container and/or interaction within objects, people, and/or agents that are members and/or followers of the container. Furthermore, container economies can be created by container owners and/or participants such that objects can be traded within and across containers.

The containers 1504, 1505 and 1506 are containers of concepts and can contain any types of objects the system supports (e.g. email, RSS, wave, document information, etc)

within the contextual states 1501, 1502 and 1053 of the system. Containers are categorised by concepts mapped to them. Therefore objects from within a particular contextual state that contain particular concepts are mapped into a container. A container may contain a mesh of all objects relating to a particular set of concepts bound by a particular contextual state. Containers 1504, 1505 and 1506 can be created by the user or can be recommended by the system to the user. Users of containers can set up goals for the container to achieve, and then the system will work towards achieving such goals. For example, a container may be created around particular concepts and the container can be assigned a goal to search for people, information, knowledge and/or data around these concepts until a certain metric is reached. This example relates to an agent based search around concepts that can trigger goal achievement.

The objects within each container are determined by the relevance framework sub-system 1101 which in turn is driven by sub-system 1103. The various sub components of 1103 store, set/determine, control and/or reason with the various methods listed herein to govern the operation of a particular container (e.g. 1504, etc). Therefore the complete operation of the containers may be governed by the relevance engine 104. Furthermore, objects within these containers may be sorted based on various mechanisms around type of object, relevancy of information with objects, objects from a certain person(s), time of object creation, location of object creation or where the object currently resides, or a combination of these mechanisms. Additionally, sorting is influenced by the contextual state of operation. Therefore containers with the same concepts could be sorted differently based on contextual information at the time of consuming the contents of a container (e.g. contextual state can be influenced by location, time, device access choice, social context/connections, etc).

Container's interconnect with other container through container pipes. These are represented by 1507, 1508 and 1509 within the contextual state of 1501 as well as 1510 representing the container pipes between contextual states. These pipes can be between some or all containers within contextual states. Furthermore, pipes can be between containers contained within different context states of a user.

The system assess the concept mapping between various containers and the container pipes, and alerts users and/or agents of possible opportunities for value creation based on concept matches. This inter-container concept pipeline assessment allows the system to recommend to the user affinities both within and/or external to the system, people with similar interests, people and/or objects that are experts on particular concepts, innovation opportunities, collaboration recommendations, relevant product and/or service offerings, and the like.

The containers within the system retain all, or selected objects and the interactions related to these objects over time. This provides a form of knowledge retention capability for the user so that a user can navigate between various containers without losing their knowledge or position within a particular container. Users and/or agents can preview the state of a container at any point in history. This is used by the relevance engine 104 to determine future relevancy.

Information, knowledge and/or objects 1512 come from various forms of digital information and/or interactions. They can be resident within a broad range of memory within various repositories including devices (PC's, laptops, mobile telephones, MID's, etc) on local hard disks, within cloud computing storage, within intranets and/or on the web in general as indicated in 1511.

Containers can be spawned such that related containers can be created. The pipes interconnecting spawned containers can be configured in various manners to allow spawned containers to inherit certain properties such that future objects can be mapped into both. An example of use here is a public and a private container mapped on the same concepts such that certain objects can be made public and shared. Furthermore, various agents can be configured to act in different manners on spawned containers. This allows for different container scenarios to be developed to simulate multiple goal outcomes.

Containers can be spatially bound. An example of such a spatially bound container could be a library or a class room or a company's research and development office such that knowledge, objects, interaction, collaboration, search, discovery and/or creation are personally ranked with spatial bounding taken into consideration. Furthermore, this spatial bounding can take the form of a virtual spatial bounding such that knowledge, objects, interaction, collaboration, search, discovery and/or creation appear within the container spatially relative to each other, but not fixed to an absolute geographic spatial reference. When containers are bound by location, whether it is virtual or physical, the Personalised Relevancy Interface 108 can display objects based on their spatial relationships such that the End User 110 experiences augmented browsing such that spatial reality is considered and the End User 110 can immerse themselves within the virtual or physical environment and interact accordingly.

Furthermore, access to these spatially bound containers can be controlled by the policies, authorities and/or privacy methods set up for the container by the container owner or container administrator. This allows spatially bound containers to be transaction controlled within the MarketPlace 105. Furthermore, products and/or services offered within the MarketPlace 105 can be physically and/or virtually spatial configured to appear with relevant containers. One example of the application of access control of spatially bound containers is access to knowledge, information, users and/or agents within a container can be controlled by either an absolute spatial reference to a user and the container and/or a relative spatial reference between two (or more) pieces of knowledge, objects, interaction, collaboration, search, discovery and/or creation.

Figure 16:
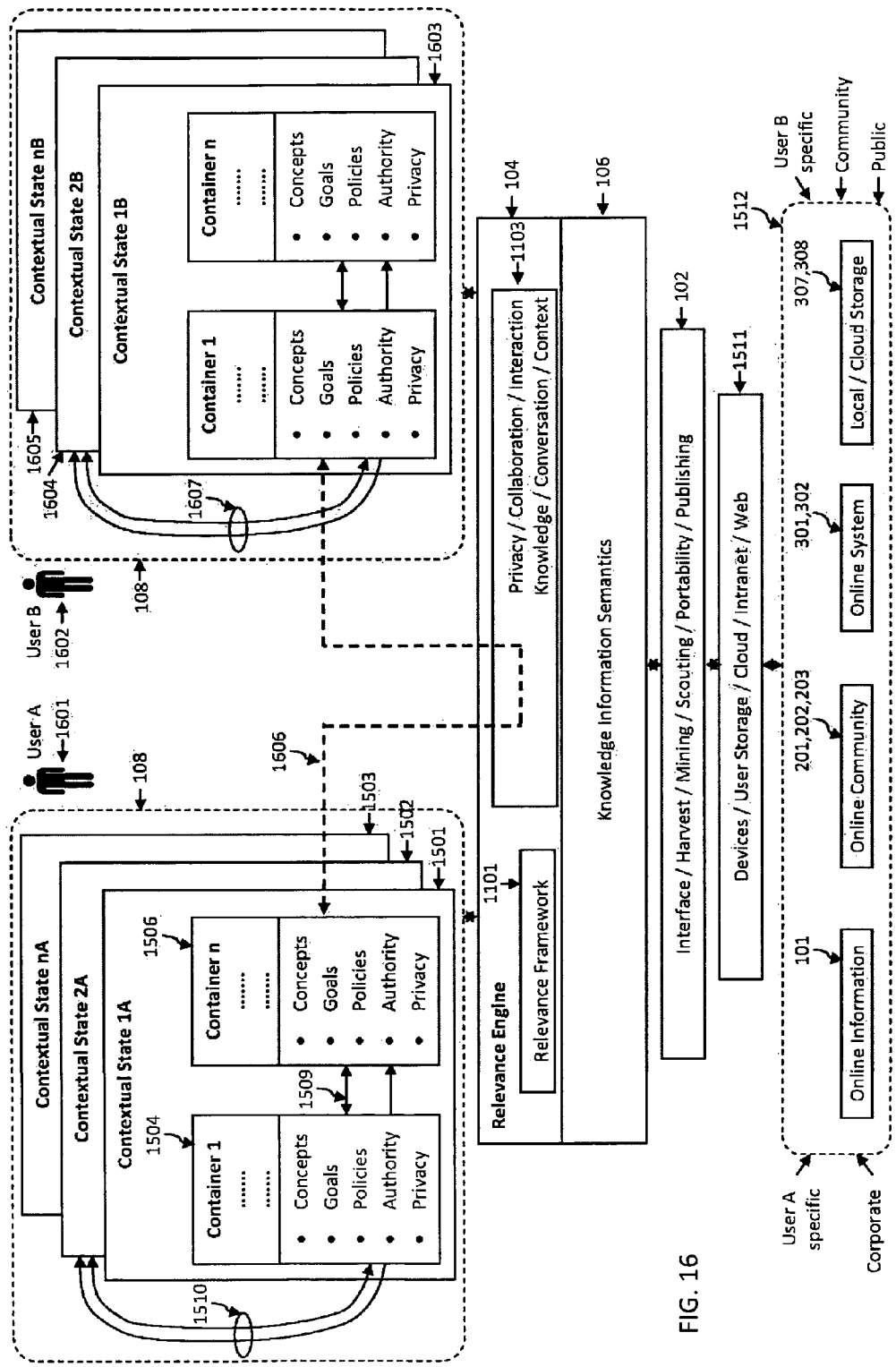
FIG. 16 is a block diagram showing the interconnection between users' containers and contextual states, in accordance with certain embodiments.

Inter-user inter-container connectivity is shown in FIG. 16. To facilitate collaboration, conversation, interaction and/or identification of affinity, experience, and/or expertise of users 1601, 1602 within the system, containers within user's individual contextual states are interconnected through inter-user inter-container pipes 1606.

The inter-user inter-container pipes 1606 are pipes that exist between user's containers. These pipes are bound by the policies, authorities and/or privacy established by the owner and/or administrator of each container. Through sub-system 1103, concept alignment and affinity, experience, and/or expertise can be determined and therefore the system can provide such recommendations to users and/or agents. Furthermore, public information discovery can be better facilitated into containers with similar concept foundations. Therefore, even if a user or agent may not necessarily have a close degree of separation with another user or agent, concept matching and/or interaction behaviour can be shared to improve the overall information discovery. This can also facilitate collaboration around concepts as well as social connection/context.

Figure 17:
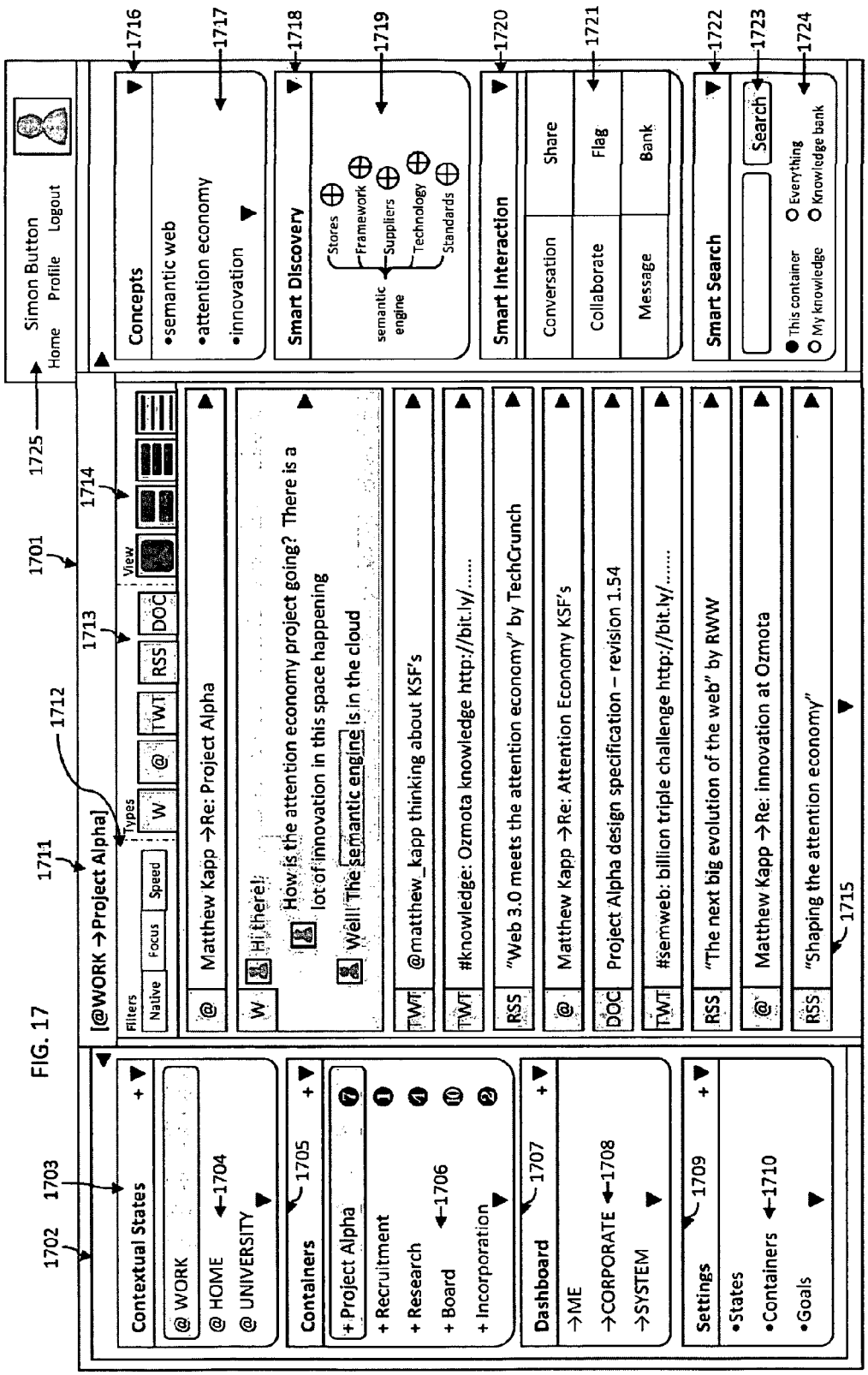
FIG. 17 is a block diagram illustrating the personalised relevancy user interface, in accordance with certain embodiments.

A desktop browser example 1701 of the Personalised Relevancy Interface 108 is depicted in FIG. 17. Note that this is an example of the personalised relevancy interface, however the layout is customised for each device 109 accessing the system with the device having its interface capabilities/modalities represented as an instance within the ontology repository 1007. Furthermore, each user 110 accessing the system can customise the layout. Within this desktop browser example 1701, the interface is an AJAX/HTML5 empowered interface leveraging key functionality available within these technologies.

The left navigation window 1702 outlines the contextual states, the containers, the user's dashboard and their settings. Each contextual state with the user's profile is displayed in section 1703 with the list of contextual states at 1704. The current contextual state in operation is highlighted showing this state in focus. The containers within the particular contextual state in focus are shown in 1705 with the list being in 1706. Furthermore, the container in focus is highlighted. Also within 1702 is the Dashboard selector 1707 with the different configurable dashboards listed in 1708. System settings for contextual states, containers and/or dashboards are configurable in 1709.

The objects stream 1715 shows the streams of information within a particular contextual state and container in focus 1711. The stream of objects can be displayed in different manners based on the view 1714 selected including but not limited to "complete object", "summary view", and "list view". The stream of objects can be reordered based on various filters 1712 including but not limited to a "native" view which sorts on time, a "focus" view which sorts on relevancy based on an object's PAR, a "speed" view which sorts based on a combination of relevancy and predicted interaction time of the content such that a user can interact with relevant objects within the stream 1715. An example of this could be an email with relevant subject matter that requires a simple yes/no answer. The user can also define user-defined filters to custom order the object stream 1715. Furthermore, the owner of the container can tailor filter parameters (object types weighting, concept weighting, social context weighting, contextual state influence weighting etc.) to manipulate the order of the object stream based on the policies, privacy and/or authority of a particular container. The stream of objects can be limited to particular object types 1713 or combination thereof. As new object types are supported by the system through inclusion within the knowledge information semantic system 106, they can become available to the user to select by type.

Each particular object in the stream can be put into focus. From this, the object can be further expanded out to view. In-object interactions can take place within the particular object using various interaction types (e.g. Wave, Instant Messaging, etc). Furthermore, the concept module 1716, smart discovery module 1718, smart interaction module 1720 and/or smart search module 1722 become enabled and initialised based on the context and concepts (the PAR) of the object in focus.

The container concepts 1716 module outlines the particular concepts found in the object that in is focus. These concepts can be represented in such a way that they demonstrate the relationship to the container's concepts indicating one degree of relevancy of the object (not the complete relevancy ranking as this is made up of more than just concept matching). Furthermore, concepts for the object can be rated and/or flagged to further improve the concept mapping function of the system. Additionally, concepts can be added/deleted/manipulated to further improve this process in a manual tagging manner. Comparisons between container concepts and object concepts can be displayed. Additionally, should the user believe the object has been incorrectly concept mapped into a particular container; the user can drag the object into a different container. Also, the user can drag supported object types into the concept window to have the system categorise this and add this to the user's container.

The smart discovery 1718 module allows the user to discover relevant information, knowledge and/or users based on concepts from with the object in focus. This allows the user to discover new information. The discovery can be presented in a number of different visualisation methods including but not limited to tree view, concept wheel and/or fishbone. As the user navigates through the discovery information, the user can select a relevant piece of information to be inserted into the container for future reference. Furthermore, subject matter experts that the system knows about can be recommended here, and the user can subsequently review the public knowledge profile of the recommended user. This allows experts, experience and/or affinity relationships to be determined/discovered. Furthermore, the user can then interact with the recommended user via the smart interaction module 1720.

The smart interaction 1720 module allows a user to interact around a particular object based on sharing, collaborating, conversing, messaging, flagging and/or storing. The smart interaction 1720 module can determine, based on the objects concepts, the social context, the contextual state, the PAP of users, and/or the policies of the container to determine which other users the user would like to interact with. This function allows the user to interact with other users based on these broad arrays of parameters. Furthermore, the smart interaction 1720 module interacts with the context management sub-system 1111 such that supplementary to the interaction process, contextual information can be passed as part of the interaction such that users and/or agents and/or the system can utilise contextual information as part of the interaction to further contextually enhance the interaction. This passing of contextual information is performed over the inter-user inter-container pipes 1606. One such example of this is when a user and/or agent invokes a VoIP call to another user and/or agent and as part of the call process contextual information is passed that details the context of the interaction, in this example it could be briefing a colleague on a meeting (whereby information about the meeting, the location, each participants calendar and the like are exchanged and displayed as part of the personalised relevancy interface of each user and/or agent). Contextual information in this example is relevant information to assist the call/interaction (for example information about the user being called, common connected colleagues, common affinities, experience profiles, travel arrangements, location etc.). This can be viewed as a technique to initialise each interaction with the system with contextually relevant information. The process of contextual information passing through the inter-user inter-container pipes 1606 between users and/or agents further contextually enhances the smart interaction process by reducing interaction latency and delay and further priming the interaction such that the information exchange is relevant to the users and/or agents instigating the interaction.

Contextual information passing can also allow agents to interact on a user's behalf to automate the interaction process based on context information. This can allow user to delegate an interaction to an agent on review of the contextual information passed as part of the interaction. For example, the user within the VoIP call example above could activate an agent to act on their behalf during the interaction.

The smart interaction 1720 module can also be set into different modes such that interaction only takes place around close degrees of social connections, or alternatively takes place with other system users not necessarily connected within a close degree of social connection. Interaction can also take place between users and agents, and agents and agents. Furthermore, the type of interaction is governed by the object type, the container policies, the device being used and/or the user/agent being interacted with. The various sub-systems in 1103 manage this process.

The smart search 1722 module allows the user to search for concepts, text and/or metadata linkages within a container, within the user's knowledge pool, within the connected knowledge of the system and/or broadly across information contained within the system. Within the smart search interface, multiple order searches can be set up to look across various connected knowledge models. Furthermore, searches can be saved and associated with particular containers therefore allowing the search to be conducted again at a later point in time by either a user and/or an agent. Additionally, searches can be shared between users and/or agents. Also, searches can be setup with necessary goals that can be added to the goals of the particular container whereby the system will monitor the search and the associated goals and notify the user and/or agent when a goal has been met. Searches can be configured such that agents are tailored to a particular user's PAP.

A user can select more than one object to be in focus within the object stream 1715. When this is done, the concepts, smart discovery, smart interaction and/or smart search modules are initialised based on the system considering all aspects of each in focus object. This allows multiple objects to be considered in clusters and to be interacted with and/or used for search and/or discovery accordingly.

Container views and the associated mechanisms to interact with the personalised relevancy interface based on smart discovery 1718, smart interaction 1720 and/or smart search 1722 are optimised for the supported modalities of the device 109. Therefore, the concepts of the personalised relevancy interface remain the same independent of the device; however the user experiences of discovery, interaction and/or search are optimised for the particular device the user is accessing the system from.

The personalised dashboard 1707 option allows the user's personalised knowledge and/or attention profiles to be reviewed. Furthermore, a user can review the knowledge and/or attention profiles of various users the user is given permission to do so as well as the knowledge pools of the overall system.

Figure 18:
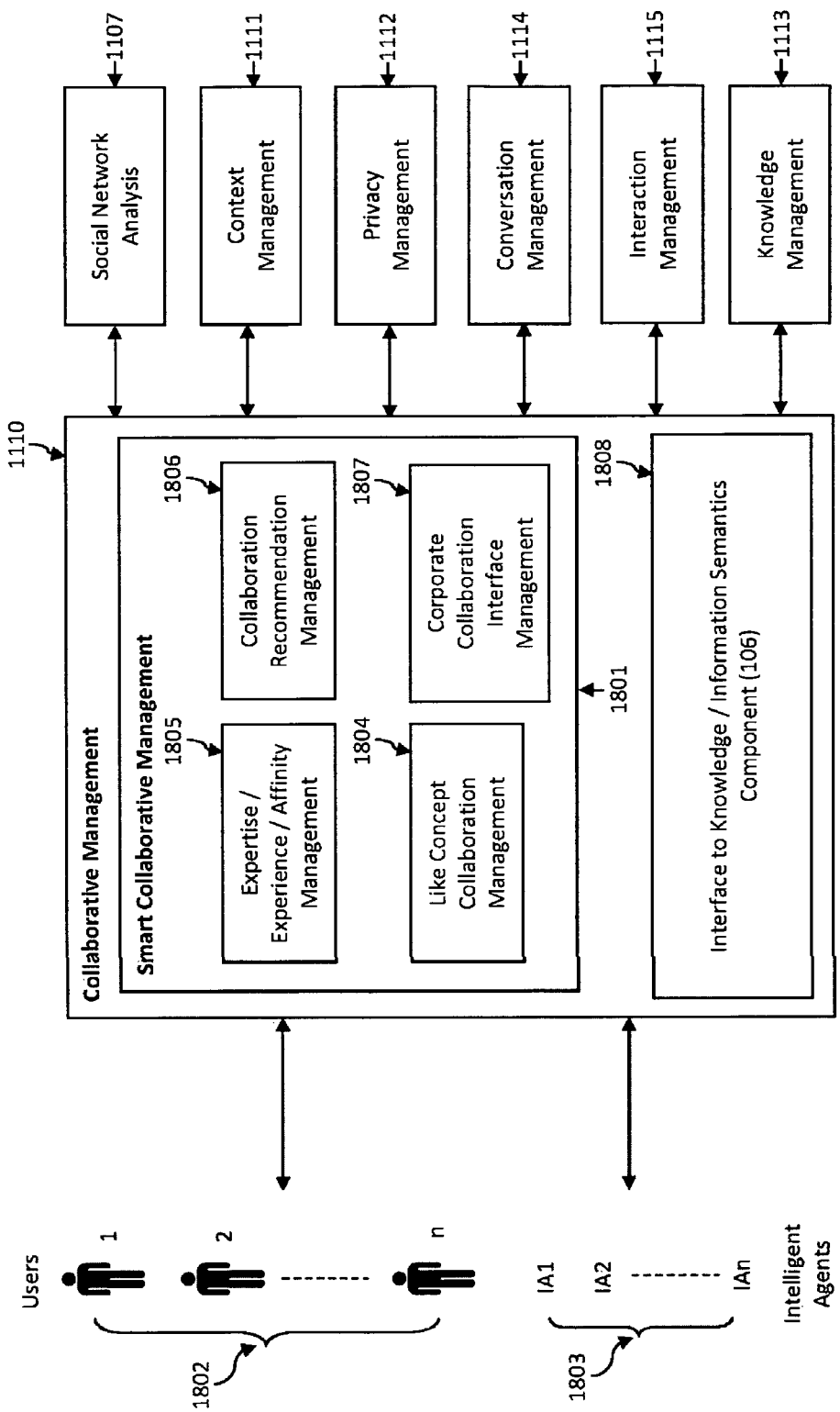
FIG. 18 is a block diagram illustrating the smart collaboration sub-system, in accordance with certain embodiments.

The Collaborative Management sub-system 1110 illustrated in FIG. 18 controls collaboration aspects within the system. This includes collaboration within contextual states and their containers around particular projects, interests and the like. The Collaborative Management sub-system 1110 is coupled to the Context 1111, Privacy 1112, Conversation 1114, Interaction 1115 and Knowledge 1113 Management sub-systems.

The Collaborative Management sub-system 1110 provides a platform of structured collaboration. This platform is built on top of the contextual ontologies contained within the SKI component 106. Structured collaboration is achieved through an inbuilt collaborative system as well as interfacing to third part collaboration tools, for example, but not limited to, Wilds and Blogs.

Corporate collaboration systems can be interfaced via the Corporate Collaboration Interface Management sub-system 1807 which then interfaces with the Interaction Management sub-system 1115 which controls secure interfacing and/or access to systems residing behind firewalls.

The Smart Collaboration Management sub-system 1801 controls collaboration recommendations and functions such as smart sharing of likeminded concepts and corporate collaboration interfacing. Each user and each intelligent agent has its own PAP and own PPP. From this, each user 1802 and intelligent agent 1803 can be represented by a collection of attention and/or knowledge capabilities. These collections are managed within the SKI component 106. These collections of capabilities are then used for several functions within the Collaborative Management sub-system 1110.

The first function relates to determining users 1802 and/or intelligent agents 1803 that have certain experience or expertise or values and belief based on these capabilities. This is determined by the Expertise, Experience and Affinity Management sub-system 1805. By determining these parameters, the system then uses this to allow expertise and/or affinity connections to be determined, discovered and/or recommended between users 1802 and/or intelligent agents 1803.

The second function is to determine proactive ways to share/collaborate information and knowledge to other users 1802 and/or intelligent agents 1803. This is done by the Collaboration Recommendation Management sub-system 1806. 1806 allows smart interaction to take place around this information and knowledge under particular contextual states and containers within. It interfaces directly with the Knowledge Management sub-system 1113. For example, a particular list of users 1802 and/or intelligent agents 1803 can be automatically generated and recommended as the interaction list based on a particular piece of information for a particular contextual state. This recommended interaction is then presented to the user within the Personalised Relevancy Interface 108. If actioned on, interaction is controlled by the Interaction Management sub-system 1115.

Concept collaboration can also occur outside of close degrees within the social connect of a user 1802 or intelligent agent 1803. In other words, information and/or knowledge can be shared and/or collaborated on based on concepts of the information and/or knowledge independent of social degrees of separation. This facilities information and/or knowledge connection spawning within the system and is not necessarily restricted by the social degrees of separation. Policies within the privacy Management 1112 control the parameters of concept collaboration.

Using the attention and/or knowledge capabilities of each individual user 1802 and/or intelligent agent 1803 and through understanding both their social connect via the Social Network Analysis sub-system 1107 and through the Like Concept Collaboration sub-system 1804, a multi-faceted knowledge and innovation network is formed. This can use semantic ontology concept mapping to generate new knowledge and/or innovation as well as using the functions of the Collaborative Management sub-system to insert this new knowledge into the personalised relevancy interface of other users 1802 and/or intelligent agents 1803 based on their contextual state.

As data within the SKI component 106 is typically temporally bound, the user 1802 and intelligent agent 1803 attention and/or knowledge capabilities change with time. This influences the innovation network therefore resulting in new knowledge and innovation hypotheses that can be presented to the user within a particular contextual state.

Figure 19:
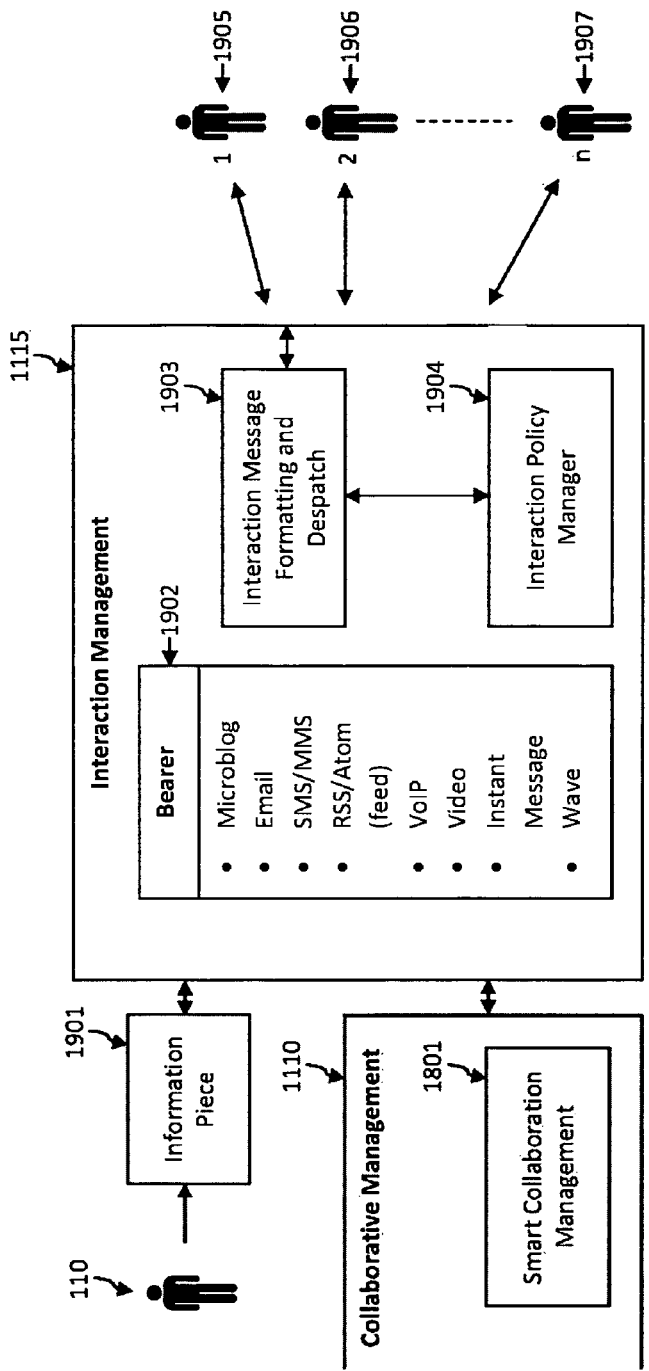
FIG. 19 is a block diagram illustrating the smart interaction sub-system, in accordance with certain embodiments.

Interactions within the system are controlled by the Interaction Management sub-system 1115, illustrated in FIG. 19.

Interactions management policies are managed here within the Interaction Policy Manager sub-system 1904. The Interaction Policy Manager 1904 determines preferred interaction bearers to be used within the system based on both the users involved in a particular interaction as well as the policy around the data/information being interacted on.

Interactions within the system are between users and can be either one-to-one or one-to-many. Interactions can also take place between users and/or intelligent agents such that it is a user-to-machine and machine-to-user interaction. This is indicated in FIG. 19 with user 1901 interacting with users 1905 (one-user) or users 1905 through to 1907 (n-users). Interactions can occur such that they are performed on an asymmetrical basis whereby policy determines that the interaction can take place in one direction only.

Through the Smart Collaboration Management sub-system 1801, which uses a user's PAP, a list of users can be automatically, semi-automatically, with user intervention, or combinations thereof generated to interact with. This is determined through the concepts represented by the Information Piece 1901 and the current contextual state. Each user will have a preferred interaction bearer and these will be taken into consideration by the Interaction Policy Manager 1904 when determining the bearer for interaction.

The Interaction Policy Manager sub-system 1904 checks that the interaction being requested is allowed under policies determined around particular context from within the Context Management sub-system 1111. The Interaction Policy Manager sub-system 1904 checks that both the state of user 1901 requesting the interaction and the states of the recipient users 1905, 1906 and 1907 are in the correct context to perform the interaction.

Interaction bearers 1902 can include micro-blogs (e.g. Tweets), email, waves, SMS, RSS/Atom, VoIP, Video, and/or instant messaging. Future interaction bearers can also be added. Formatting of the interaction (e.g. message) is performed by sub-system 1903. Interactions can be formatted in different manners, with this being controlled by the Interaction Policy Manager 1904.

Messages can be encrypted through various encryption algorithms and then substituted with an advertisement in public streams such that only the intended/authorised recipients can view the unencrypted message. This provides a means for viral advertising of both the system solution as well as third party advertisers. One form of authorisation can be formed through the use of user and message keys that are exchanged to unlock messages. These keys can be bound by contextual states and containers within these states and can also be temporally and/or spatially bound. Message encryption is performed within sub-system 1903. Furthermore, sub-system 1903 performs interaction message formatting based on the user, the bearer and the interface to the bearer host.

Interactions can be contained within the platform that can reside behind a firewall and the interactions are performed over IP SEC and VPN. The Interaction Policy Manager sub-system 1904 interfaces with access control systems to perform user authentication within an organisation or entity.

The Interaction Management sub-system 1115 provides valid interaction types to the Relevance Framework sub-system 1101 for inclusion into the Personalised Relevancy Interface 108. Additionally, sub-system 1115 can also interact with bearers within various systems including mobile operators, ISPs, enterprises and/or unified messaging solutions.

Figure 20:
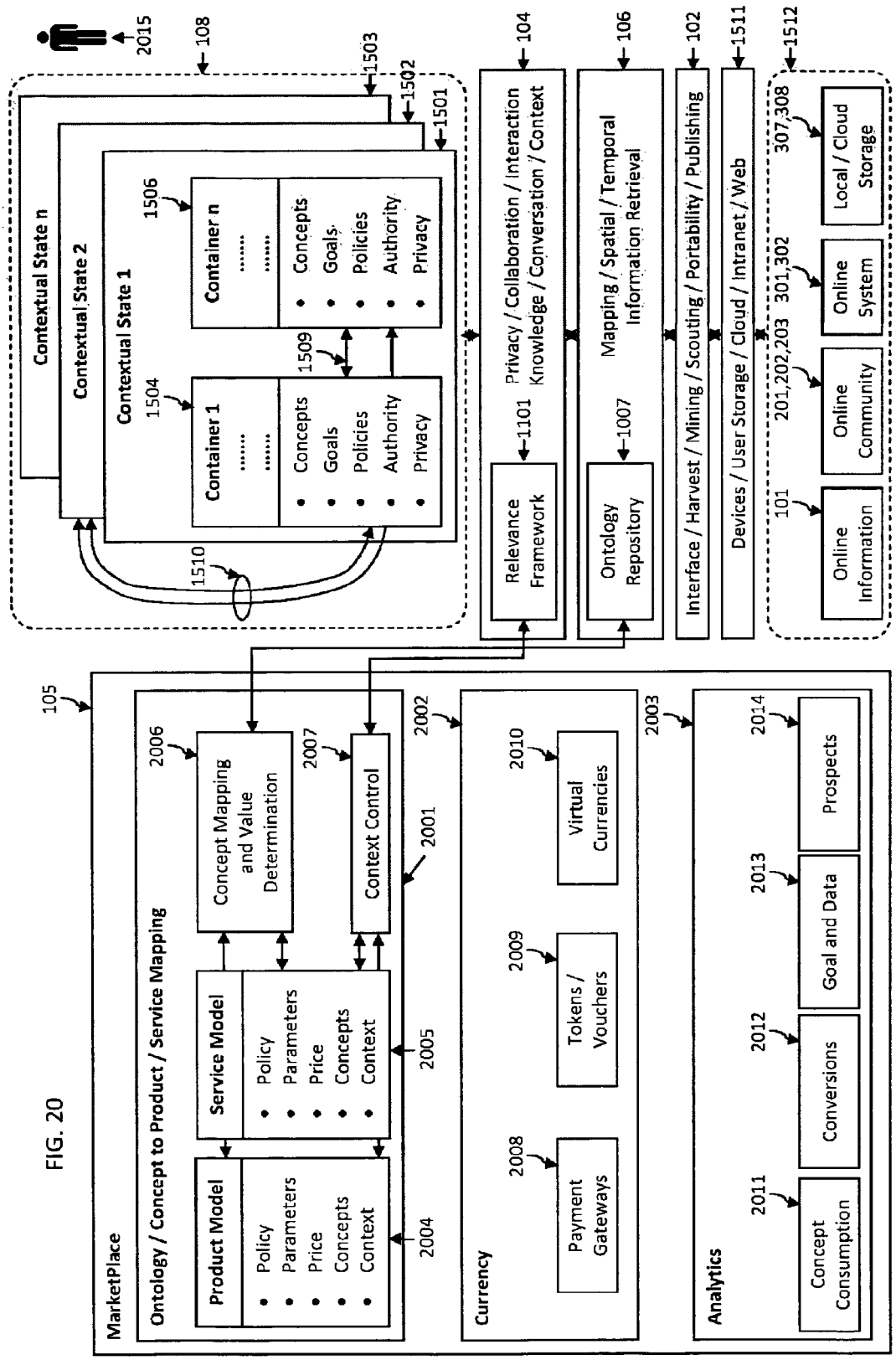
FIG. 20 is a block diagram illustrating the marketplace within the system framework, in accordance with certain embodiments.

The MarketPlace sub-system 105 is illustrated in FIG. 20. The MarketPlace sub-system is an ontology based product and/or services framework that allows advertisers and/or marketeers to map their products and/or services to various concepts supported by ontologies within the Knowledge Information Semantics sub-system 106 and stored in the ontology repository 1007.

The MarketPlace sub-system 105 is comprised of three sub-systems, the ontology/concept to product/service sub-system 2001, the currency sub-system 2002 and the analytics sub-system 2003. Within sub-system 2001, products and/or services along with their associated policies, parameters, price, concepts and/or relevant context are mapped into the system via the concept mapping and value determination sub-system 2006 and the context control sub-system 2007. Advertisers and/or marketeers can develop concept maps into supported system ontologies and program the contextual parameters that will cause a marketplace event to occur. Furthermore new system concepts can be created by the advertiser utilising the concept creation sub-system 2016. The concept creation sub-system 2016 allows advertisers to develop concepts from their products and/or service offerings and link these concepts, and the associated ontology into the SKI component 106.

The concept mapping and value determination sub-system 2006 can automatically map an advertiser's product and/or services inventory into the existing concepts within the system. This mapping semantically annotates concepts about the advertiser's product and/or services, interconnecting these concepts into the SKI component 106. From the collective knowledge and behavioural modelling data within the system, concept optimisation on the advertiser's product and/or services inventory can be performed to minimise any cold-start issues with new concepts within the system that advertiser's inventory has generated. Furthermore, the value determination system then allows advertisers and/or marketeers to bid for concept mapping opportunities within the system. Contextual parameters such as location and/or time can be set to further enhance the contextual relevance of a product or service. Furthermore, container goals can be linked to providing relevant services and/or products linked to user constructed goals. Upon completing this mapping process, a value is placed on the map and this is the cost to the advertiser/marketeer to trigger such a marketplace event. This cost can be calculated in various traditional online advertising models such as CPC, CPM along with cost-per-action. Furthermore, system specific cost models are presented that are tied to tokens and vouchers.

The advertiser and/or marketeer can additionally format the object style for inclusion into the object stream 1715 based and the various devices supported by the system represented by instances of the DEV ontology 1010. This is used by the sub-systems within the relevance framework 1101 to correctly display the marketplace object within the relevant objects of a container. Premiums can be paid based on the nature of the concept mapping, the context parameters and/or the demand on the particular concepts being mapped.

The policies of a container can determine if marketplace objects can be inserted into the object stream 1715 of a particular container.

A service within the system could relate to a particular interaction that can be presented to the user within the smart interaction module 1720 of the Personalised Relevancy Interface 108. This interaction can be bound by the parameters of the service model as well as the policies of the container in focus. Products and/or services can be presented within the smart discovery module 1718 and/or smart search module 1722. This allows relevant products and/or service to be presented to the user for consumption. This presentation can also be bound by the policies of the container in focus.

The currency system 2002 contains the payment gateway sub-system 2008, the tokens/vouchers sub-system 2009 and the virtual currency sub-system 2010. The payment gateway sub-system 2008 allows interconnection to other payment gateways so that the system can support payments for products and/or services. Information in relation to the payment types supported and the payment parameters are interconnected into the relevance engine 104 and the knowledge information semantics 106 sub-system to allow payment gateways to be standardised within the system. The tokens/vouchers sub-system 2009 allows products and/or services to be consumed based on particular advertisers and/or marketeers tokens and/or vouchers. An example of this is a mobile coupon whereby a user can pay for a service or product based on contextual situational matches (i.e. location, time, etc) and/or relevancy matches. The virtual currencies sub-system 2010 can allow products and/or services to be traded based on virtual currencies. Furthermore, users of the system can associate their information and/or knowledge with concepts and promote/market these within the marketplace which can then also be traded using the real or virtual currencies, tokens or vouchers. This allows knowledge, information and/or innovation economies to be established within the system.

The analytics system 2003 contains the concept consumption sub-system 2011, the conversions sub-system 2012, the goal and data sub-system 2013 and/or the prospects sub-system 2014. The concept consumption sub-system 2011 provides analytics on how products and/or services mapped to particular concepts are being consumed. This provides detailed analytics around the contextual aspects of consumption allowing advertisers and/or marketeers to constantly review their concept mapping and/or context control aspects of their products and/or services. The conversions sub-system 2012 provides detailed analytics on the conversion rates of products and/or services. This provides useful feedback to advertisers and/or marketeers on the conversion of their products and/or services. Furthermore, the analytics system can interact with a $3^{rd}$ party online site such that concept conversion and/or return on concept can be measured and reported to the advertiser. Additionally, based on this example of a "closed loop" conversion system, revenues for user concept transactions could be revenue shared. The goal and data sub-system 2013 provides analytics based on known goals and/or data within the system such that new, modified goals and/or objects can be recommended to users through either smart discovery 1718, smart search 1722, smart interaction 1720 and/or within the user's knowledge dashboard 1707 that will facilitate addition product and/or service consumption. The prospects sub-system 2014 provides analytics based on reasoning of system data around contextual ontologies within 1007 to ascertain if additional concept mapping and/or context control can be associated with a product and/or service to further improve its consumption and/or conversions.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of series of equivalent or similar features.

The methods in accordance with the disclosed embodiments may be implemented using a general purpose computer system. The methods may be implemented as software, such as one or more application programs executable within the computer system. In particular, the steps of the method are affected by instructions in the software that are carried out within the computer system. The instructions may be formed as one or more code modules, each for performing one or more particular tasks. The software may also be divided into two separate parts, in which a first part and the corresponding code modules performs the method and a second part and the corresponding code modules manage a user interface between the first part and the user. The software may be stored in a computer readable medium, including the storage devices described herein. The software is loaded into the computer system from the computer readable medium, and then executed by the computer system. A computer readable medium having such software or computer program recorded on the computer readable medium is a computer program product. The use of the computer program product in the computer system preferably affects an advantageous apparatus.

The computer system comprises a computer module, input devices such as, but not limited to, a keyboard, touch screen, a mouse pointer device, and output devices including a display device. An external Modulator-Demodulator (Modem) transceiver device may be used by the computer module for communicating to and from a communications network. The network may be a wide-area network (WAN), such as the Internet or a private WAN. The computer may be connected to the network using a high capacity (e.g., cable) connection, and the modem may be a broadband modem. A wireless modem may also be used for wireless connection to the network.

The computer module typically includes at least one processor unit, and a memory unit for example formed from semiconductor random access memory (RAM) and read only memory (ROM). The computer module may also include, but is not limited to, a number of input/output (I/O) interfaces including an audio-video interface that couples to the video display and loudspeakers, an I/O interface for the keyboard and mouse and an interface for the external modem. The computer module also has a local network interface that permits coupling of the computer system to a local computer network, known as a Local Area Network (LAN). The local network may also couple to the wide-area network via a connection.

Storage devices are provided and typically include, but are not limited, to a secondary storage device such as local hard disk drive (HDD) or remote network attached storage device (NAS).

Typically, the application programs are resident on the secondary storage device and read and controlled in execution by the processor. Intermediate storage of such programs and any data fetched from the networks may be accomplished using the semiconductor memory, possibly in concert with the hard disk drive. In some instances, the application programs may be supplied to the user encoded on one or more CD-ROM and read via the corresponding drive, or alternatively may be read by the user from the networks. Still further, the software can also be loaded into the computer system from other tangible computer readable media. Computer readable media refers to any storage medium that participates in providing instructions and/or data to the computer system for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module.

The methods to be described may also be implemented, at least in part, in dedicated hardware such as one or more integrated circuits performing the functions or sub functions to be described. Such dedicated hardware may include dedicated processors, digital signal processors, or one or more microprocessors and associated memories.

A number of methods, servers, systems, and computer program products have been disclosed with reference to certain embodiments. The embodiments disclosed are applicable to the computer and data processing industries, amongst others.

The foregoing describes only some embodiments, and modifications and/or changes can be made thereto without departing from the scope and spirit of the disclosed embodiments, the embodiments being illustrative and not restrictive.

Furthermore, the inventions have described in connection with certain embodiments, it is to be understood that the inventions are not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A system for creating a personal ranking of specific to a user information, the system comprising:
   an interface for interfacing with online data, stored user data, and user device data;
   a processor executing an application to configured for analyzing information derived or inferred at least in part from the online data, the stored user data, and the user device data, wherein the analysis incorporates criteria derived or inferred from both the stored user data and the user device data;
   a database, the database configured for storing data relating to inputs and/or outputs of the relevance engine or the application, wherein the relevance engine is further configured for generating a series of personalised attention rankings outputs accessible by the user device by applying both a user-specific attention profile and a user-specific psychometric profile in producing machine readable, user-specific attention ranking of the online data; and
   further wherein the personalised attention rankings outputs are generated at least partially in response to changes in the personalised attention profile outputs or changes in the personalised the psychometric profile outputs specific to the user.

2. The system according to claim 1, wherein the application further comprises an information retrieval means which utilizes the interface for interfacing to at least one or more structured, unstructured, or semi-structured instances of the online data and the stored user data, wherein to retrieve information.

3. The system according to claim 1, wherein the application further comprises an ontology repository containing a list of ontologies.

4. The system according to claim 3, wherein the list of ontologies includes a link to the location of each of the ontologies.

5. The system according to claim 4, whereby each of the link addresses identify either a representation of a corresponding ontology within the ontology repository or within an external storage location.

6. The system according to claim 1, wherein the application further comprises natural language processing.

7. The system according to claim 6, wherein the natural language processing has a first input configured for receiving the information, a second input configured for receiving ontology representations from the ontology repository, and an output configured for delivering extracted concepts, wherein each extracted concept corresponds to a concept found within the information.

8. The system according to claim 1, wherein the application further comprises an ontology mapping function.

9. The system according to claim 8, wherein the ontology mapping function creates records relating to the extracted concepts for the information.

10. The system according to claim 1, wherein the relevance engine further comprises a contextual awareness function.

11. The system according to claim 10, wherein the contextual awareness function further comprises a contextual state.

12. The system according to claim 11, wherein the contextual state further comprises a container, the container comprising a means of grouping the information containing similar ones of the concepts.

13. The system according to claim 12, wherein the container further comprises:
    a concept providing means configured for associating the information with the container;
    a goal providing means configured for providing goal based actions or interactions; and
    a policy providing means configured for controlling actions and/or interactions.

14. The system according to claim 12, wherein the grouping of the information within the container is further ordered in a manner corresponding to the attention ranking.

15. The system according to claim 1, wherein the database further comprises:
    a semantic database including a plurality of records, each record descriptive of information derived; and a content store, for storage of content, wherein the semantic database is configured as a standalone database or a federated database, and wherein the content store may reside in the standalone database or the federated database, the semantic database being configured to permit communication.

16. The system according to claim 1, wherein the interface is configured to be adapted or extended to support additional volume of the online data and/or stored user data sources.

17. A method of generating a personal ranking of information specific to a user, the method comprising:
    interfacing with online data, stored user data and user device data;
    analysing information derived or inferred, at least in part, from the online data, stored user data and user device data, wherein the analysis incorporates criteria derived or inferred from both the stored user data and the user device data;
    generating an analysis output selected from a group consisting of personalised attention profile outputs, personalized psychometric profile outputs or a combination thereof;

storing information relating to data from at least one data source selected from a group consisting of online data, stored user data and analysis output data; and generating a personalised attention ranking of the analysed information, wherein the personalised attention ranking is accessible to the user through the user device.

18. The method according to claim 17, wherein the step of analysing the information comprises steps of:

retrieving at least part of one or more structured, unstructured, or semi-structured information of the online data and the stored user data;

conducting natural language processing of the information to identify and extract a concept; and mapping an extracted concept into at least part of an ontology.

19. The method according to claim 17, further comprising deriving a user's psychometric profile, the psychometric profile being determined, at least in part, by analysing at least one user attribute selected from a group consisting of one or more of a user's knowledge, cognitive abilities, attitudes, or personality.

20. The method according to claim 17, further comprising the step of computing a user's attention profile determined, at least in part, by analysing at least one user attribute selected from a group consisting of the user's priorities, interests, preferences and social context.

21. The method according to claim 17, wherein the step of calculating the attention ranking of the information incorporates data from the attention profile and/or the psychometric profile to produce the attention ranking.

22. A system for generating a personal ranking of online data for a specific user, the system comprising:

an interface configured for interfacing with online data, stored user data and user device data;

a processor executing an application for accessing the online data and generating an analysis, wherein the analysis incorporates criteria derived or inferred from both the stored user data and the user device data;

a relevance engine configured for receiving the analysis and applying both a user-specific attention profile and a user-specific psychometric profile to produce a machine readable, user-specific attention ranking of the online data; and a retrieval means through which the user accesses online data corresponding to at least a prioritized portion of the user-specific attention ranking.

23. A system for periodically generating a personal ranking of online data for a specific user, the system comprising:

an interface configured for interfacing with online data, stored user data and user device data;

a processor executing an application for accessing the online data and generating an analysis, wherein the analysis incorporates criteria derived or inferred from the stored user data and the user device data;

a relevance engine configured for receiving the analysis and applying a user-specific attention profile and a user-specific psychometric profile to produce a machine readable, user-specific attention ranking of the online data; and a retrieval means through which the user accesses online data corresponding to at least a prioritized portion of the user-specific attention ranking.

24. The system for periodically generating a personal ranking of online data according to claim 23 wherein:

the user-specific attention ranking is generated substantially continuously.

25. The system for periodically generating a personal ranking of online data according to claim 23 wherein:

the user-specific attention ranking is generated independently of any search inquiry submitted by the specific user.

* * * * *